United States Patent
Minto et al.

(10) Patent No.: US 9,617,914 B2
(45) Date of Patent: Apr. 11, 2017

(54) SYSTEMS AND METHODS FOR MONITORING GAS TURBINE SYSTEMS HAVING EXHAUST GAS RECIRCULATION

(71) Applicants: General Electric Company, Schenectady, NY (US); ExxonMobil Upstream Research Company, Houston, TX (US)

(72) Inventors: Karl Dean Minto, Ballston Lake, NY (US); Douglas Frank Beadie, Greer, SC (US)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 354 days.

(21) Appl. No.: 14/312,665

(22) Filed: Jun. 23, 2014

(65) Prior Publication Data

US 2015/0000294 A1  Jan. 1, 2015

Related U.S. Application Data

(60) Provisional application No. 61/841,235, filed on Jun. 28, 2013.

(51) Int. Cl.
*F02C 3/34* (2006.01)
*F02C 9/00* (2006.01)
(Continued)

(52) U.S. Cl.
CPC ............... *F02C 3/34* (2013.01); *F01D 17/02* (2013.01); *F02C 3/20* (2013.01); *F02C 9/00* (2013.01);
(Continued)

(58) Field of Classification Search
CPC combination set(s) only.
See application file for complete search history.

(56) References Cited

U.S. PATENT DOCUMENTS

| 2,488,911 A | 11/1949 | Hepburn et al. |
| 2,884,758 A | 5/1959 | Oberle |

(Continued)

FOREIGN PATENT DOCUMENTS

| CA | 2231749 | 9/1998 |
| CA | 2645450 | 9/2007 |

(Continued)

OTHER PUBLICATIONS

PCT International Search Report and Written Opinion; Application No. PCT/US2014/043973; Dated Oct. 24, 2014; 10 pages.

(Continued)

*Primary Examiner* — David Walczak
(74) *Attorney, Agent, or Firm* — Fletcher Yoder P.C.

(57) ABSTRACT

A system includes a plurality of extraction passages configured to passively extract a portion of a gas flow from a downstream region of a gas flow path. The system includes a plurality of sensors respectively coupled to the plurality of extraction passages, wherein the plurality of sensors is configured to measure one or more parameters of the portion of the gas flow traversing the plurality of extraction passages. The system also includes a manifold coupled to the plurality of extraction passages, wherein the manifold is configured to receive the portion of the gas flow from the plurality of extraction passages. The system further includes a return passage coupled to the manifold, wherein the return passage is configured to passively provide the portion of the gas flow to an upstream region of the gas flow path.

23 Claims, 8 Drawing Sheets

(51) Int. Cl.
 *F01D 17/20* (2006.01)
 *F02C 3/20* (2006.01)
 *F01D 17/02* (2006.01)
 *F02C 9/28* (2006.01)

(52) U.S. Cl.
 CPC ............ *F02C 9/28* (2013.01); *F05D 2260/80* (2013.01); *F05D 2270/0831* (2013.01); *F05D 2270/80* (2013.01); *Y02E 20/16* (2013.01); *Y02T 50/677* (2013.01)

(56) References Cited

U.S. PATENT DOCUMENTS

| | | |
|---|---|---|
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis et al. |
| 3,949,548 A | 4/1976 | Lockwood |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |

(56) References Cited

U.S. PATENT DOCUMENTS

| | | |
|---|---|---|
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |

(56) References Cited

U.S. PATENT DOCUMENTS

| | | |
|---|---|---|
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,328,577 B2 | 2/2008 | Stewart et al. |
| 7,340,939 B2 | 3/2008 | Jansen |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,578,177 B2 | 8/2009 | Bunce |
| 7,591,866 B2 | 9/2009 | Bose |
| 7,594,386 B2 | 9/2009 | Narayanan et al. |
| 7,610,752 B2 | 11/2009 | Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |

(56) References Cited

U.S. PATENT DOCUMENTS

| | | | |
|---|---|---|---|
| 7,976,803 B2 | 7/2011 | Hooper et al. | |
| 7,980,312 B1 | 7/2011 | Hill et al. | |
| 7,985,399 B2 | 7/2011 | Drnevich et al. | |
| 7,988,750 B2 | 8/2011 | Lee et al. | |
| 8,001,789 B2 | 8/2011 | Vega et al. | |
| 8,029,273 B2 | 10/2011 | Paschereit et al. | |
| 8,036,813 B2 | 10/2011 | Tonetti et al. | |
| 8,038,416 B2 | 10/2011 | Ono et al. | |
| 8,038,746 B2 | 10/2011 | Clark | |
| 8,038,773 B2 | 10/2011 | Ochs et al. | |
| 8,046,986 B2 | 11/2011 | Chillar et al. | |
| 8,047,007 B2 | 11/2011 | Zubrin et al. | |
| 8,051,638 B2 | 11/2011 | Aljabari et al. | |
| 8,061,120 B2 | 11/2011 | Hwang | |
| 8,062,617 B2 | 11/2011 | Stakhev et al. | |
| 8,065,870 B2 | 11/2011 | Jobson et al. | |
| 8,065,874 B2 | 11/2011 | Fong et al. | |
| 8,074,439 B2 | 12/2011 | Foret | |
| 8,080,225 B2 | 12/2011 | Dickinson et al. | |
| 8,083,474 B2 | 12/2011 | Hashimoto et al. | |
| 8,097,230 B2 | 1/2012 | Mesters et al. | |
| 8,101,146 B2 | 1/2012 | Fedeyko et al. | |
| 8,105,559 B2 | 1/2012 | Melville et al. | |
| 8,109,720 B2 * | 2/2012 | Merchant | B64D 33/04 415/207 |
| 8,110,012 B2 | 2/2012 | Chiu et al. | |
| 8,117,825 B2 | 2/2012 | Griffin et al. | |
| 8,117,846 B2 | 2/2012 | Wilbraham | |
| 8,127,558 B2 | 3/2012 | Bland et al. | |
| 8,127,936 B2 | 3/2012 | Liu et al. | |
| 8,127,937 B2 | 3/2012 | Liu et al. | |
| 8,133,298 B2 | 3/2012 | Lanyi et al. | |
| 8,166,766 B2 | 5/2012 | Draper | |
| 8,167,960 B2 | 5/2012 | Gil | |
| 8,176,982 B2 | 5/2012 | Gil et al. | |
| 8,191,360 B2 | 6/2012 | Fong et al. | |
| 8,191,361 B2 | 6/2012 | Fong et al. | |
| 8,196,387 B2 | 6/2012 | Shah et al. | |
| 8,196,413 B2 | 6/2012 | Mak | |
| 8,201,402 B2 | 6/2012 | Fong et al. | |
| 8,205,455 B2 | 6/2012 | Popovic | |
| 8,206,669 B2 | 6/2012 | Schaffer et al. | |
| 8,209,192 B2 | 6/2012 | Gil et al. | |
| 8,215,105 B2 | 7/2012 | Fong et al. | |
| 8,220,247 B2 | 7/2012 | Wijmans et al. | |
| 8,220,248 B2 | 7/2012 | Wijmans et al. | |
| 8,220,268 B2 | 7/2012 | Callas | |
| 8,225,600 B2 | 7/2012 | Theis | |
| 8,226,912 B2 | 7/2012 | Kloosterman et al. | |
| 8,240,142 B2 | 8/2012 | Fong et al. | |
| 8,240,153 B2 | 8/2012 | Childers et al. | |
| 8,245,492 B2 | 8/2012 | Draper | |
| 8,245,493 B2 | 8/2012 | Minto | |
| 8,247,462 B2 | 8/2012 | Boshoff et al. | |
| 8,257,476 B2 | 9/2012 | White et al. | |
| 8,261,823 B1 | 9/2012 | Hill et al. | |
| 8,262,343 B2 | 9/2012 | Hagen | |
| 8,266,883 B2 | 9/2012 | Ouellet et al. | |
| 8,266,913 B2 | 9/2012 | Snook et al. | |
| 8,268,044 B2 | 9/2012 | Wright et al. | |
| 8,281,596 B1 | 10/2012 | Rohrssen et al. | |
| 8,316,665 B2 | 11/2012 | Mak | |
| 8,316,784 B2 | 11/2012 | D'Agostini | |
| 8,337,613 B2 | 12/2012 | Zauderer | |
| 8,347,600 B2 | 1/2013 | Wichmann et al. | |
| 8,348,551 B2 | 1/2013 | Baker et al. | |
| 8,371,100 B2 | 2/2013 | Draper | |
| 8,372,251 B2 | 2/2013 | Goller et al. | |
| 8,377,184 B2 | 2/2013 | Fujikawa et al. | |
| 8,377,401 B2 | 2/2013 | Darde et al. | |
| 8,388,919 B2 | 3/2013 | Hooper et al. | |
| 8,397,482 B2 | 3/2013 | Kraemer et al. | |
| 8,398,757 B2 | 3/2013 | Iijima et al. | |
| 8,409,307 B2 | 4/2013 | Drnevich et al. | |
| 8,414,694 B2 | 4/2013 | Iijima et al. | |
| 8,424,282 B2 | 4/2013 | Vollmer et al. | |
| 8,424,601 B2 | 4/2013 | Betzer-Zilevitch | |
| 8,436,489 B2 | 5/2013 | Stahlkopf et al. | |
| 8,453,461 B2 | 6/2013 | Draper | |
| 8,453,462 B2 | 6/2013 | Wichmann et al. | |
| 8,453,583 B2 | 6/2013 | Malavasi et al. | |
| 8,454,350 B2 | 6/2013 | Berry et al. | |
| 8,475,160 B2 | 7/2013 | Campbell et al. | |
| 8,539,749 B1 | 9/2013 | Wichmann et al. | |
| 8,567,200 B2 | 10/2013 | Brook et al. | |
| 8,616,294 B2 | 12/2013 | Zubrin et al. | |
| 8,627,643 B2 | 1/2014 | Chillar et al. | |
| 9,085,996 B2 * | 7/2015 | Ponnuraj | F01D 25/305 |
| 2001/0000049 A1 | 3/2001 | Kataoka et al. | |
| 2001/0029732 A1 | 10/2001 | Bachmann | |
| 2001/0045090 A1 | 11/2001 | Gray | |
| 2002/0043063 A1 | 4/2002 | Kataoka et al. | |
| 2002/0053207 A1 | 5/2002 | Finger et al. | |
| 2002/0069648 A1 | 6/2002 | Levy et al. | |
| 2002/0187449 A1 | 12/2002 | Doebbeling et al. | |
| 2003/0005698 A1 | 1/2003 | Keller | |
| 2003/0131582 A1 | 7/2003 | Anderson et al. | |
| 2003/0134241 A1 | 7/2003 | Marin et al. | |
| 2003/0221409 A1 | 12/2003 | McGowan | |
| 2004/0006994 A1 | 1/2004 | Walsh et al. | |
| 2004/0068981 A1 | 4/2004 | Siefker et al. | |
| 2004/0112059 A1 | 6/2004 | Wilkes | |
| 2004/0166034 A1 | 8/2004 | Kaefer | |
| 2004/0170559 A1 | 9/2004 | Hershkowitz et al. | |
| 2004/0223408 A1 | 11/2004 | Mathys et al. | |
| 2004/0238654 A1 | 12/2004 | Hagen et al. | |
| 2005/0028529 A1 | 2/2005 | Bartlett et al. | |
| 2005/0144961 A1 | 7/2005 | Colibaba-Evulet et al. | |
| 2005/0197267 A1 | 9/2005 | Zaki et al. | |
| 2005/0229585 A1 | 10/2005 | Webster | |
| 2005/0236602 A1 | 10/2005 | Viteri et al. | |
| 2006/0112675 A1 | 6/2006 | Anderson et al. | |
| 2006/0158961 A1 | 7/2006 | Ruscheweyh et al. | |
| 2006/0183009 A1 | 8/2006 | Berlowitz et al. | |
| 2006/0196812 A1 | 9/2006 | Beetge et al. | |
| 2006/0248888 A1 | 11/2006 | Geskes | |
| 2007/0000242 A1 | 1/2007 | Harmon et al. | |
| 2007/0044475 A1 | 3/2007 | Leser et al. | |
| 2007/0044479 A1 | 3/2007 | Brandt et al. | |
| 2007/0089425 A1 | 4/2007 | Motter et al. | |
| 2007/0107430 A1 | 5/2007 | Schmid et al. | |
| 2007/0144747 A1 | 6/2007 | Steinberg | |
| 2007/0231233 A1 | 10/2007 | Bose | |
| 2007/0234702 A1 | 10/2007 | Hagen et al. | |
| 2007/0245736 A1 | 10/2007 | Barnicki | |
| 2007/0249738 A1 | 10/2007 | Haynes et al. | |
| 2007/0272201 A1 | 11/2007 | Amano et al. | |
| 2008/0000229 A1 | 1/2008 | Kuspert et al. | |
| 2008/0006561 A1 | 1/2008 | Moran et al. | |
| 2008/0010967 A1 | 1/2008 | Griffin et al. | |
| 2008/0034727 A1 | 2/2008 | Sutikno | |
| 2008/0038598 A1 | 2/2008 | Berlowitz et al. | |
| 2008/0047280 A1 | 2/2008 | Dubar | |
| 2008/0066443 A1 | 3/2008 | Frutschi et al. | |
| 2008/0115478 A1 | 5/2008 | Sullivan | |
| 2008/0118310 A1 | 5/2008 | Graham | |
| 2008/0127632 A1 | 6/2008 | Finkenrath et al. | |
| 2008/0155984 A1 | 7/2008 | Liu et al. | |
| 2008/0178611 A1 | 7/2008 | Ding | |
| 2008/0202123 A1 | 8/2008 | Sullivan et al. | |
| 2008/0223038 A1 | 9/2008 | Lutz et al. | |
| 2008/0250795 A1 | 10/2008 | Katdare et al. | |
| 2008/0251234 A1 | 10/2008 | Wilson et al. | |
| 2008/0290719 A1 | 11/2008 | Kaminsky et al. | |
| 2008/0309087 A1 | 12/2008 | Evulet et al. | |
| 2009/0000762 A1 | 1/2009 | Wilson et al. | |
| 2009/0025390 A1 | 1/2009 | Christensen et al. | |
| 2009/0038247 A1 | 2/2009 | Taylor et al. | |
| 2009/0056342 A1 | 3/2009 | Kirzhner | |
| 2009/0064653 A1 | 3/2009 | Hagen et al. | |
| 2009/0071166 A1 | 3/2009 | Hagen et al. | |
| 2009/0107141 A1 | 4/2009 | Chillar et al. | |
| 2009/0117024 A1 | 5/2009 | Weedon et al. | |
| 2009/0120087 A1 | 5/2009 | Sumser et al. | |

(56) References Cited

U.S. PATENT DOCUMENTS

| | | |
|---|---|---|
| 2009/0157230 A1 | 6/2009 | Hibshman et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0257868 A1 | 10/2009 | Fonda-Bonardi |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ElKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ElKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0117963 A1 | 5/2012 | Hepburn et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |
| 2014/0060073 A1 | 3/2014 | Slobodyanskiy et al. |
| 2014/0123620 A1 | 5/2014 | Huntington et al. |
| 2014/0123624 A1 | 5/2014 | Minto |
| 2014/0123659 A1 | 5/2014 | Biyani et al. |
| 2014/0123660 A1 | 5/2014 | Stoia et al. |
| 2014/0123668 A1 | 5/2014 | Huntington et al. |
| 2014/0123669 A1 | 5/2014 | Huntington et al. |
| 2014/0123672 A1 | 5/2014 | Huntington et al. |

FOREIGN PATENT DOCUMENTS

| | | |
|---|---|---|
| CN | 101852104 A | 10/2010 |
| CN | 102733955 A | 10/2012 |
| CN | 103069130 A | 4/2013 |
| EP | 0770771 | 5/1997 |
| GB | 0776269 | 6/1957 |
| GB | 2117053 | 10/1983 |
| WO | WO 9906674 | 2/1999 |
| WO | WO 9963210 | 12/1999 |
| WO | WO 2007068682 | 6/2007 |
| WO | WO 2008142009 | 11/2008 |
| WO | WO 2011003606 | 1/2011 |
| WO | WO 2012003489 | 1/2012 |
| WO | 2012018457 A1 | 2/2012 |
| WO | WO 2012128928 | 9/2012 |
| WO | WO 2012128929 | 9/2012 |
| WO | WO 2012170114 | 12/2012 |
| WO | PCT/RU2013/000162 | 2/2013 |
| WO | WO 2013147632 | 10/2013 |
| WO | WO 2013147633 | 10/2013 |
| WO | WO 2013155214 | 10/2013 |
| WO | WO 2013163045 | 10/2013 |
| WO | WO 2014071118 | 5/2014 |
| WO | WO 2014071215 | 5/2014 |

OTHER PUBLICATIONS

U.S. Appl. No. 14/144,511, filed Dec. 30, 2013, Thatcher et al.
U.S. Appl. No. 14/067,679, filed Oct. 30, 2013, Fadde et al.
U.S. Appl. No. 14/067,714, filed Oct. 30, 2013, Antoniono et al.
U.S. Appl. No. 14/067,726, filed Oct. 30, 2013, Antoniono et al.
U.S. Appl. No. 14/067,731, filed Oct. 30, 2013, Antoniono et al.
U.S. Appl. No. 14/067,739, filed Oct. 30, 2013, Antoniono et al.
U.S. Appl. No. 14/067,797, filed Oct. 31, 2013, Krull et al.
U.S. Appl. No. 14/135,055, filed Dec. 19, 2013, Biyani et al.
Ahmed, S. et al. (1998) "Catalytic Partial Oxidation Reforming of Hydrocarbon Fuels," 1998 Fuel Cell Seminar, 7 pgs.
Air Products and Chemicals, Inc. (2008) "Air Separation Technology—Ion Transport Membrane (ITM)," www.airproducts.com/ASUsales, 3 pgs.
Air Products and Chemicals, Inc. (2011) "Air Separation Technology Ion Transport Membrane (ITM)," www.airproducts.com/gasification, 4 pgs.
Anderson, R. E. (2006) "Durability and Reliability Demonstration of a Near-Zero-Emission Gas-Fired Power Plant," California Energy Comm., CEC 500-2006-074, 80 pgs.
Baxter, E. et al. (2003) "Fabricate and Test an Advanced Non-Polluting Turbine Drive Gas Generator," U. S. Dept. of Energy, Nat'l Energy Tech. Lab., DE-FC26-00NT 40804, 51 pgs.
Bolland, O. et al. (1998) "Removal of CO2 From Gas Turbine Power Plants Evaluation of Pre- and Postcombustion Methods,"

(56) References Cited

OTHER PUBLICATIONS

SINTEF Group, www.energy.sintef.no/publ/xergi/98/3/art-8engelsk.htm, 11 pgs.
BP Press Release (2006) "BP and Edison Mission Group Plan Major Hydrogen Power Project for California," www.bp.com/hydrogenpower, 2 pgs.
Bryngelsson, M. et al. (2005) "Feasibility Study of $CO_2$ Removal From Pressurized Flue Gas in a Fully Fired Combined Cycle—The Sargas Project," KTH—Royal Institute of Technology, Dept. of Chemical Engineering and Technology, 9 pgs.
Clark, Hal (2002) "Development of a Unique Gas Generator for a Non-Polluting Power Plant," California Energy Commission Feasibility Analysis, P500-02-011F, 42 pgs.
Foy, Kirsten et al. (2005) "Comparison of Ion Transport Membranes" Fourth Annual Conference on Carbon Capture and Sequestration, DOE/NETL; 11 pgs.
Cho, J. H. et al. (2005) "Marrying LNG and Power Generation," Energy Markets; 10, 8; ABI/INFORM Trade & Industry, 5 pgs.
Ciulia, Vincent. (2001-2003) "Auto Repair. How the Engine Works," http://autorepair.about.com/cs/generalinfo/a/aa060500a.htm, 1 page.
Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.
Science Clarified (2012) "Cryogenics," http://www.scienceclarified.com/Co-Di/Cryogenics.html; 6 pgs.
Defrate, L. A. et al. (1959) "Optimum Design of Ejector Using Digital Computers" Chem. Eng. Prog. Symp. Ser., 55 ( 21), 12 pgs.
Ditaranto, M. et al. (2006) "Combustion Instabilities in Sudden Expansion Oxy-Fuel Flames," ScienceDirect, Combustion and Flame, v.146, 20 pgs.
Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.
Eriksson, Sara. (2005) "Development of Methane Oxidation Catalysts for Different Gas Turbine Combustor Concepts." KTH—The Royal Institute of Technology, Department of Chemical Engineering and Technology, Chemical Technology, Licentiate Thesis, Stockholm Sweden; 45 pgs.
Ertesvag, I. S. et al. (2005) "Exergy Analysis of a Gas-Turbine Combined-Cycle Power Plant With Precombustion $CO_2$ Capture," Elsevier, 35 pgs.
ElKady, Ahmed M. et al. (2009) "Application of Exhaust Gas Recirculation in a DLN F-Class Combustion System for Postcombustion Carbon Capture," ASME J. Engineering for Gas Turbines and Power, vol. 131, 6 pgs.
Evulet, Andrei T. et al. (2009) "On the Performance and Operability of GE's Dry Low $NO_x$ Combustors utilizing Exhaust Gas Recirculation for Post-Combustion Carbon Capture" Energy Procedia I, 8 pgs.
Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf , 22 pgs.
Luby, P. et al. (2003) "Zero Carbon Power Generation: IGCC as the Premium Option," Powergen International, 19 pgs.
MacAdam, S. et al. (2007) "Coal-Based Oxy-Fuel System Evaluation and Combustor Development," Clean Energy Systems, Inc.; presented at the $2^{nd}$ International Freiberg Conference on IGCC & XtL Technologies, 6 pgs.
Morehead, H. (2007) "Siemens Global Gasification and IGCC Update," Siemens, Coal-Gen, 17 pgs.
Nanda, R. et al. (2007) "Utilizing Air Based Technologies as Heat Source for LNG Vaporization," presented at the $86^{th}$ Annual convention of the Gas Processors of America (GPA 2007), San Antonio, TX 13 pgs.
Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.
Reeves, S. R. (2003) "Enhanced Coalbed Methane Recovery," Society of Petroleum Engineers 101466-DL; SPE Distinguished Lecture Series, 8 pgs.
Richards, Geo A., et al. (2001) "Advanced Steam Generators." National Energy Technology Lab., Pittsburgh, PA, and Morgantown, WV; NASA Glenn Research Center (US). 7 pgs.
Rosetta, M. J. et al. (2006) "Integrating Ambient Air Vaporization Technology with Waste Heat Recovery—A Fresh Approach to LNG Vaporization," presented at the $85^{th}$ annual convention of the Gas Processors of America (GPA 2006), Grapevine, Texas, 22 pgs.
Snarheim, D. et al. (2006) "Control Design for a Gas Turbine Cycle With $CO_2$ Capture Capabilities," Modeling, Identification and Control, vol. 00; presented at the $16^{th}$ IFAC World Congress, Prague, Czech Republic, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.
Van Hemert, P. et al. (2006) "Adsorption of Carbon Dioxide and a Hydrogen-Carbon Dioxide Mixture," Intn'l Coalbed Methane Symposium (Tuscaloosa, AL) Paper 0615, 9 pgs.
Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.
First CN Office Action and English Translation; Application No. CN 201480045024.7; Dated Nov. 28, 2016; 22 pages.

* cited by examiner

SYSTEMS AND METHODS FOR MONITORING GAS TURBINE SYSTEMS HAVING EXHAUST GAS RECIRCULATION

CROSS-REFERENCE TO RELATED APPLICATIONS

This application claims priority to and benefit of U.S. Provisional Patent Application No. 61/841,235, entitled "SYSTEMS AND METHODS FOR MONITORING GAS TURBINE SYSTEMS HAVING EXHAUST GAS RECIRCULATION," filed on Jun. 28, 2013, which is herein incorporated by reference in its entirety for all purposes.

BACKGROUND

The subject matter disclosed herein relates to gas turbine systems, such as exhaust gas recirculation (EGR) gas turbine systems.

Gas turbine engines are used in a wide variety of applications, such as power generation, aircraft, and various machinery. Gas turbine engines generally combust a fuel with an oxidant (e.g., air) in a combustor section to generate hot combustion products, which then drive one or more turbine stages of a turbine section. The turbine stages, when driven by the hot combustion products, generate torque to drive a shaft. The rotating shaft, in turn, drives one or more compressor stages of a compressor section, and can also drive an electrical generator of the gas turbine engine to produce electrical energy. During operation, it may be desirable to measure one or more properties of a particular gas flow to improve control of the gas turbine engine. Furthermore, it may be desirable to improve the acquisition of measurement data to improve efficiency and reduce losses in the gas turbine engine.

BRIEF DESCRIPTION

Certain embodiments commensurate in scope with the originally claimed subject matter are summarized below. These embodiments are not intended to limit the scope of the claimed invention, but rather these embodiments are intended only to provide a brief summary of possible forms of the invention. Indeed, the present disclosure may encompass a variety of forms that may be similar to or different from the embodiments set forth below.

In an embodiment, a system includes a gas turbine engine having a combustor section with one or more combustors configured to combust a fuel and produce an exhaust gas. The system includes a turbine section comprising one or more turbine stages disposed downstream from the combustor and configured to be driven by the exhaust gas. The system also includes an exhaust section disposed downstream from the one or more turbine stages, wherein the exhaust section has an exhaust passage configured to receive the exhaust gas from the turbine section. The system further includes a gas flow extraction system coupled to the exhaust section having a plurality of extraction passages disposed about the exhaust section, wherein each extraction path is configured to receive a portion of the exhaust gas from a downstream portion of the exhaust passage. Further, the gas flow extraction system is configured to passively route the portion of the exhaust gas to an upstream portion of the exhaust passage via one or more return passages.

In another embodiment, a method includes combusting a fuel with an oxidant in a combustor of a gas turbine system to generate an exhaust gas. The method includes driving a turbine of the gas turbine system with the exhaust gas from the combustor and providing the exhaust gas from the turbine through an exhaust passage in an exhaust section of the gas turbine system. The method also includes passively extracting a portion of the exhaust gas from a downstream portion of the exhaust passage via one or more of extraction passages. The method also includes performing one or more measurements on the portion of the exhaust gas using one or more sensors coupled to the plurality of extraction passages. The method further includes passively routing the portion of the exhaust gas to an upstream portion of the exhaust passage via one or more return passages.

In another embodiment, a system includes a gas flow path through a rotary machine, wherein the gas flow path has a high-pressure downstream region and a low-pressure upstream region. The system includes an extraction passage configured to passively extract a portion of a gas flow from the high-pressure downstream region of the gas flow path. The system includes a sensor coupled to the extraction passage and configured to measure a parameter of the portion of the gas flow traversing the extraction passage. The system further includes a return passage coupled to the extraction passage, wherein the return passage is configured to passively route the portion of the gas flow from the extraction passage to the low-pressure upstream region of the gas flow path.

In another embodiment, a system includes a plurality of extraction passages configured to passively extract a portion of a gas flow from a downstream region of a gas flow path. The system includes a plurality of sensors respectively coupled to the plurality of extraction passages, wherein the plurality of sensors is configured to measure one or more parameters of the portion of the gas flow traversing the plurality of extraction passages. The system also includes a manifold coupled to the plurality of extraction passages, wherein the manifold is configured to receive the portion of the gas flow from the plurality of extraction passages. The system further includes a return passage coupled to the manifold, wherein the return passage is configured to passively provide the portion of the gas flow to an upstream region of the gas flow path.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
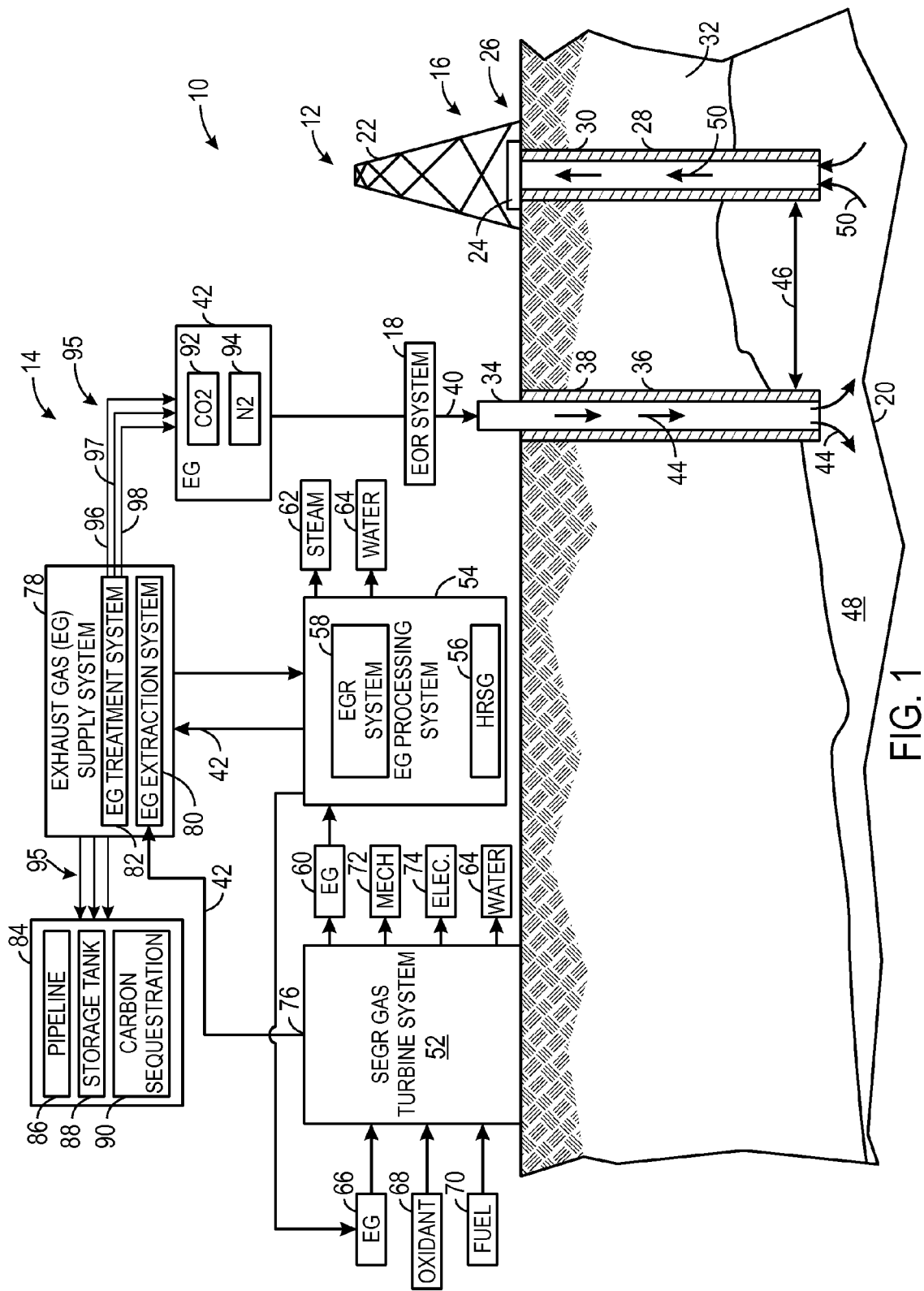
FIG. 1 is a diagram of an embodiment of a system having a turbine-based service system coupled to a hydrocarbon production system.

One or more specific embodiments of the present invention will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper," "lower," "left," "right," "front," "rear," "top," "bottom," "horizontal," "vertical," "upstream," "downstream," "fore," "aft," and the like; merely describe the configuration shown in the FIGS. Indeed, the element or elements of an embodiment of the present invention may be oriented in any direction and the terminology, therefore, should be understood as encompassing such variations unless specified otherwise.

As discussed in detail below, the disclosed embodiments relate generally to gas turbine systems with exhaust gas recirculation (EGR), and particularly stoichiometric operation of the gas turbine systems using EGR. For example, the gas turbine systems may be configured to recirculate the exhaust gas along an exhaust recirculation path, stoichiometrically combust fuel and oxidant along with at least some of the recirculated exhaust gas, and capture the exhaust gas for use in various target systems. In addition to controlling the flow of the fuel and/or oxidant, the recirculation of the exhaust gas along with stoichiometric combustion may help to increase the concentration level of $CO_2$ in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, and unburnt hydrocarbons), and increasing energy recovery (e.g., with heat recovery units).

Indeed, a number of benefits may be realized by utilizing the recirculated exhaust gas within the EGR gas turbine system in accordance with the present disclosure, including increased time-in-operation for various components, wider operating ranges for various components due to enhanced cooling capabilities, and so on. Such embodiments are described in further detail below, with the general components of the EGR gas turbine system first being introduced, followed by specific examples of the manner in which the recirculated exhaust gas may be utilized within the EGR gas turbine system.

As discussed in detail below, the disclosed embodiments relate generally to gas turbine systems, including gas turbine systems with EGR, such as stoichiometric exhaust gas recirculation (SEGR) gas turbine systems. As set forth above, it may be desirable to measure one or more properties (e.g., temperature, chemical composition, and so forth) of a particular gas flow in a gas turbine system. For example, it may be desirable to determine a chemical composition of a gas flow traversing an exhaust section of the gas turbine engine. Accordingly, present embodiments include systems and methods by which small portions of the gas flow, referred to herein as sense streams, may be passively extracted from the gas flow and directed through a number of extraction passages. As discussed in detail below, each of the extraction passages may include one or more sensors to analyze the sense streams, for example, to determine the chemical composition of the gas flow. By analyzing these sense streams, a controller may be able to determine aspects of the operation of the SEGR gas turbine system. For example, in certain embodiments, a controller may determine that the sense stream of an exhaust gas flow is rich in oxidant, unburnt fuel, and/or water vapor, and may adjust parameters of the SEGR gas turbine system in response to modify the composition of the sampled gas flow such that it includes substantially less oxidant, unburnt fuel, and/or water vapor, providing a purer exhaust gas for use in various downstream processes discussed below. By further example, in certain embodiments, a controller may determine the composition of the sense stream and may modify parameters of the SEGR gas turbine system to maintain stoichiometric or near-stoichiometric combustion (e.g., at a target equivalence ratio of 0.95 to 1.05, as discussed below).

Further, present embodiments enable passive extraction of the sense streams, in which the sense streams may be extracted from a downstream, higher pressure region of the gas flow, analyzed by the one or more sensors within each extraction passage, and then subsequently reintroduced back into an upstream, lower pressure region of the gas flow. Accordingly, while the present approach may be discussed below in the context of a gas turbine system and, more specifically, a SEGR gas turbine system, it should be appreciated that the present approach may be useful in any number of contexts involving the passive sampling of a gas flow near a piece of equipment that operates under or provides a pressure differential (e.g., an exhaust section, a compressor section, a blower, or any other suitable rotary machine).

With the foregoing in mind, FIG. 1 is a diagram of an embodiment of a system 10 having a hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi ($\Phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburnt fuel or oxidant remaining. For example, the exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_X$, CO, $SO_X$, $O_2$, $N_2$, $H_2$, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_X$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or 30 percent by volume. In contrast, the $CO_2$ lean, $N_2$ rich stream 98 may have a $CO_2$ purity or concentration level of less than approximately 1, 2, 3, 4, 5, 10, 15, 20, 25, or 30 percent by volume, and a $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburnt fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_x$), carbon monoxide (CO), sulfur oxides (e.g., $SO_x$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_x$), carbon monoxide (CO), sulfur oxides (e.g., $SO_x$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion and/or fuel nozzles of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the exhaust gas 66, oxidant 68, and fuel 70 flow through the head end portion (e.g., through fuel nozzles) into the combustion portion (e.g., combustion chamber) of each combustor, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburnt fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

Figure 2:
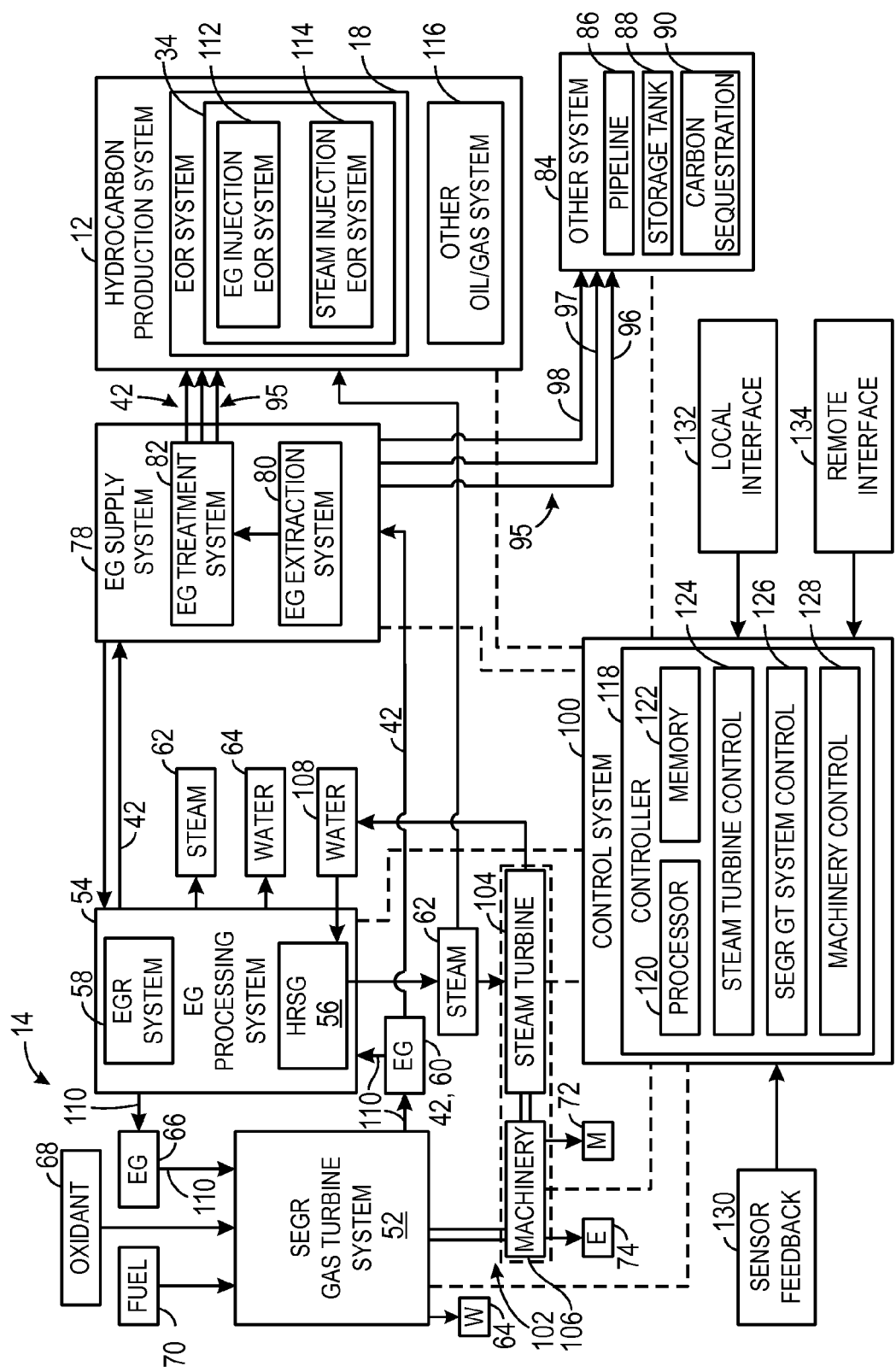
FIG. 2 is a diagram of an embodiment of the system of FIG. 1, further illustrating a control system and a combined cycle system.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and delivery the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14. The exhaust gas 42 and/or the steam 62 produced by the turbine-based service system 14 also may be routed to the hydrocarbon production system 12 for use in other oil/gas systems 116.

The quantity, quality, and flow of the exhaust gas 42 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The controls 124, 126, and 128 may include software and/or hardware controls. For example, the controls 124, 126, and 128 may include various instructions or code stored on the memory 122 and executable by the processor 120. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may includes sensors for nitrogen oxides (e.g., $NO_X$ sensors), carbon oxides (e.g., CO sensors and $CO_2$ sensors), sulfur oxides (e.g., $SO_X$ sensors), hydrogen (e.g., $H_2$ sensors), oxygen (e.g., $O_2$ sensors), unburnt hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburnt hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburnt hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_X$) within a target range of less than approximately 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_X$) within a target range of less than approximately 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburnt fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburnt fuel by volume of the exhaust gas 42, 60; or the threshold levels of oxidant (e.g., oxygen) and/or unburnt fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburnt fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas 42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

Figure 3:
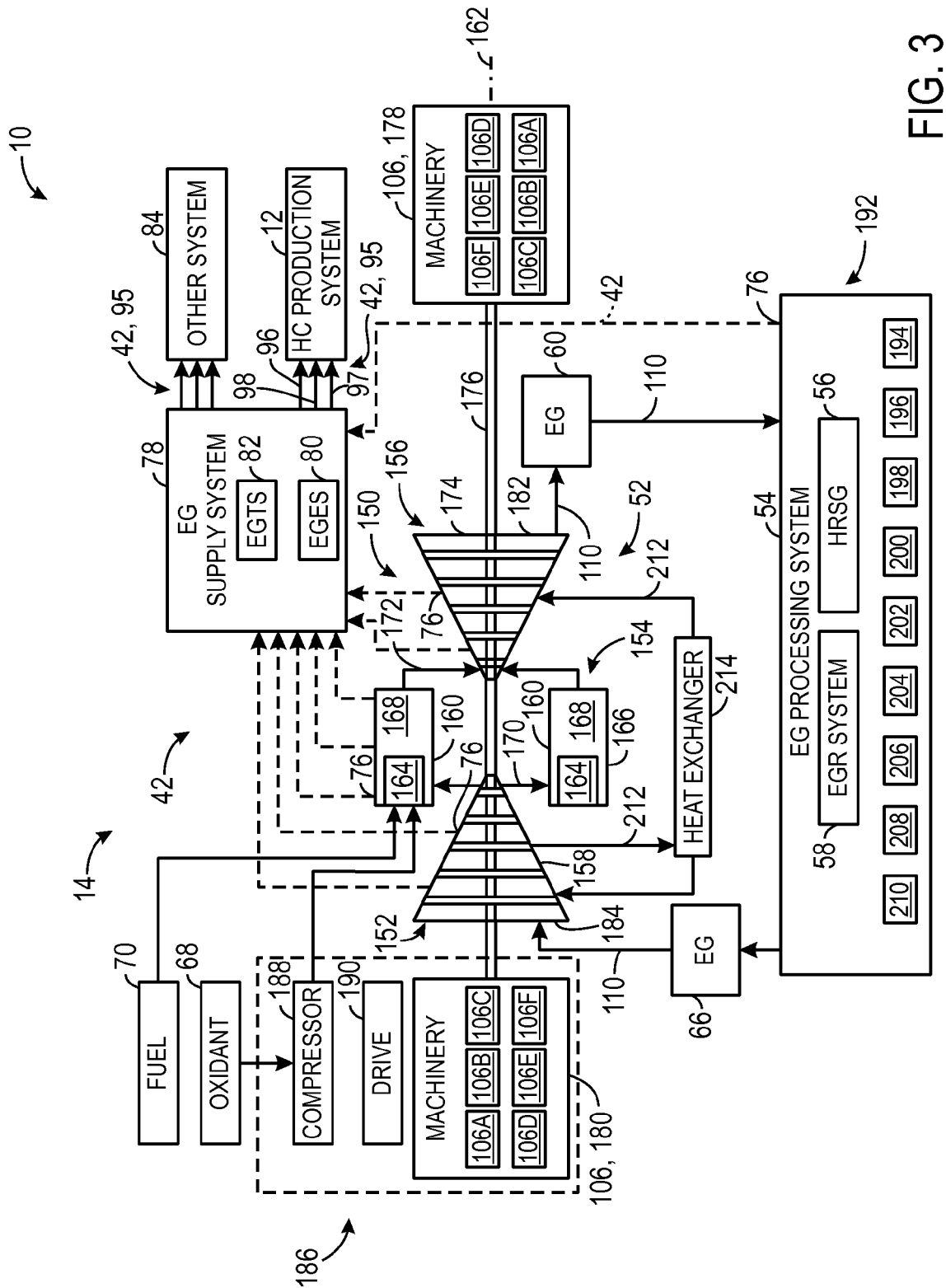
FIG. 3 is a diagram of an embodiment of the system of FIGS. 1 and 2, further illustrating details of a gas turbine engine, exhaust gas supply system, and exhaust gas processing system.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of $NO_X$ (e.g., NO and $NO_2$). Regardless of the type of fuel nozzle 164, the SEGR gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as $NO_X$ emissions, the disclosed embodiments use one or more diluents to help control the temperature and emissions while still avoiding any premixing of the fuel 70 and oxidant 68. For example, the disclosed embodiments may introduce one or more diluents separate from the fuel 70 and oxidant 68 (e.g., after the point of combustion and/or downstream from the diffusion flame), thereby helping to reduce the temperature and reduce the emissions (e.g., $NO_X$ emissions) produced by the diffusion flame.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. steam turbine 104, electrical motor, etc.) coupled to the SEGR gas turbine system 52. Non-limiting examples are discussed in further detail below with reference to TABLE 1. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in certain embodiments employing more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 106. In each of these embodiments, the compression system 186 compresses and supplies the oxidant 68 to the fuel nozzles 164 and the combustors 160. Accordingly, some or all of the machinery 106, 178, 180 may be configured to increase the operational efficiency of the compression system 186 (e.g., the compressor 188 and/or additional compressors).

The variety of components of the machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as EG booster compressors), one or more power generation units (e.g., electrical generators), one or more drives (e.g., steam turbine engines, electrical motors), heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact. Examples of indirect heat exchangers include intercooler heat exchangers and heat recovery units, such as heat recovery steam generators. The heat exchangers also may include heaters. As discussed in further detail below, each of these machinery components may be used in various combinations as indicated by the non-limiting examples set forth in TABLE 1.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176. As illustrated below, TABLE 1 depicts some non-limiting examples of arrangements of the machinery 106, 178, 180 disposed proximate and/or coupled to the compressor and turbine sections 152, 156.

TABLE 1

| 106A | 106B | 106C | 106D | 106E | 106F |
|------|------|------|------|------|------|
| MOC | GEN | | | | |
| MOC | GBX | GEN | | | |
| LP | HP | GEN | | | |
| MOC | MOC | | | | |
| HP | GBX | LP | GEN | | |
| MOC | | MOC | | | |
| MOC | GBX | GEN | | | |
| MOC | | | | | |
| HP | GBX | GEN | LP | | |
| MOC | | | MOC | | |
| MOC | GBX | GEN | | | |
| MOC | GBX | DRV | | | |
| DRV | GBX | LP | HP | GBX | GEN |
| | | MOC | MOC | | |
| DRV | GBX | HP | LP | GEN | |
| | | MOC | MOC | | |
| HP | GBX | LP | GEN | | |
| MOC | CLR | MOC | | | |
| HP | GBX | LP | GBX | GEN | |
| MOC | CLR | MOC | | | |
| HP | GBX | LP | GEN | | |
| MOC | HTR | MOC | | | |
| | STGN | | | | |
| MOC | GEN | DRV | | | |
| MOC | DRV | GEN | | | |
| DRV | MOC | GEN | | | |
| DRV | CLU | MOC | GEN | | |
| DRV | CLU | MOC | GBX | GEN | |

As illustrated above in TABLE 1, a cooling unit is represented as CLR, a clutch is represented as CLU, a drive is represented by DRV, a gearbox is represented as GBX, a generator is represented by GEN, a heating unit is represented by HTR, a main oxidant compressor unit is represented by MOC, with low pressure and high pressure variants being represented as LP MOC and HP MOC, respectively, and a steam generator unit is represented as STGN. Although TABLE 1 illustrates the machinery 106, 178, 180 in sequence toward the compressor section 152 or the turbine section 156, TABLE 1 is also intended to cover the reverse sequence of the machinery 106, 178, 180. In TABLE 1, any cell including two or more components is intended to cover a parallel arrangement of the components. TABLE 1 is not intended to exclude any non-illustrated permutations of the machinery 106, 178, 180. These components of the machinery 106, 178, 180 may enable feedback control of temperature, pressure, and flow rate of the oxidant 68 sent to the gas turbine engine 150. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location.

However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the $CO_2$ rich, $N_2$ lean stream 96, the intermediate concentration $CO_2$, $N_2$ stream 97, and the $CO_2$ lean, $N_2$ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200, 202, 204, 206, 208, and 210. These EG treatment components 192 (e.g., 194 through 210) may be disposed along the exhaust recirculation path 110 in one or more series arrangements, parallel arrangements, or any combination of series and parallel arrangements. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements. As illustrated below, TABLE 2 depicts some non-limiting examples of arrangements of the components 192 along the exhaust recirculation path 110.

TABLE 2

| 194 | 196 | 198 | 200 | 202 | 204 | 206 | 208 | 210 |
|---|---|---|---|---|---|---|---|---|
| CU | HRU | BB | MRU | PRU | | | | |
| CU | HRU | HRU | BB | MRU | PRU | DIL | | |
| CU | HRSG | HRSG | BB | MRU | PRU | | | |
| OCU | HRU | OCU | HRU | OCU | BB | MRU | PRU | |
| HRU CU | HRU CU | BB | MRU | PRU | | | | |
| HRSG OCU | HRSG OCU | BB | MRU | PRU | DIL | | | |
| OCU | HRSG OCU | OCU | HRSG OCU | BB | MRU | PRU | DIL | |
| OCU | HRSG ST | HRSG ST | BB | COND | INER | WFIL | CFIL | DIL |
| OCU HRSG ST | OCU HRSG ST | BB | COND | INER | FIL | DIL | | |
| OCU | HRSG ST | HRSG ST | OCU | BB | MRU HE COND | MRU WFIL | PRU INER | PRU FIL CFIL |
| CU | HRU COND | HRU COND | HRU COND | BB | MRU HE COND WFIL | PRU INER | PRU FIL CFIL | DIL |

As illustrated above in TABLE 2, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., steam, nitrogen, or other inert gas) is represented by DIL. Although TABLE 2 illustrates the components 192 in sequence from the exhaust outlet 182 of the turbine section 156 toward the exhaust inlet 184 of the compressor section 152, TABLE 2 is also intended to cover the reverse sequence of the illustrated components 192. In TABLE 2, any cell including two or more components is intended to cover an integrated unit with the components, a parallel arrangement of the components, or any combination thereof. Furthermore, in context of TABLE 2, the HRU, the HRSG, and the COND are examples of the HE; the HRSG is an example of the HRU; the COND, WFIL, and CFIL are examples of the WRU; the INER, FIL, WFIL, and CFIL are examples of the PRU; and the WFIL and CFIL are examples of the FIL. Again, TABLE 2 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
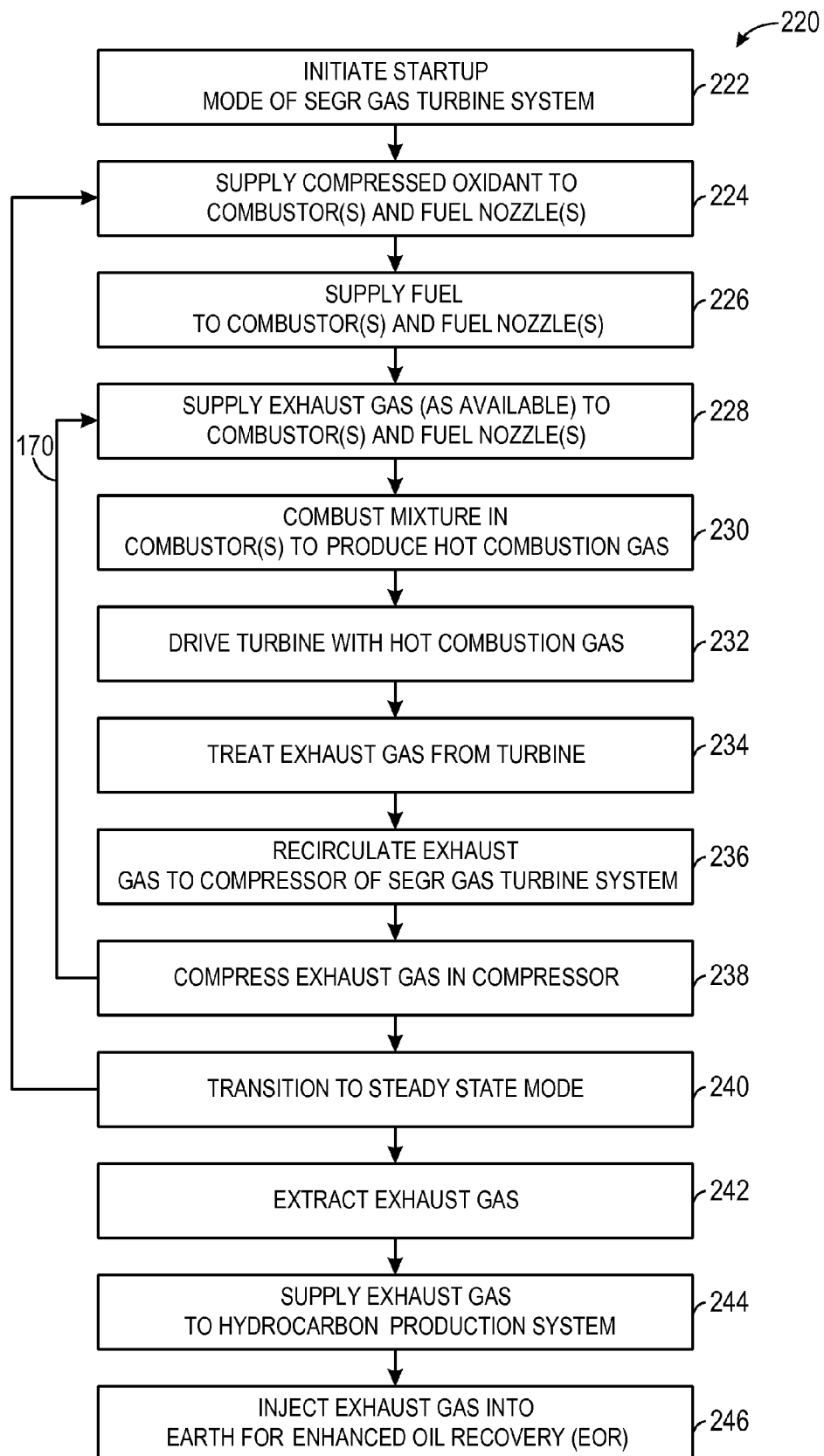
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburnt fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

Figure 5:
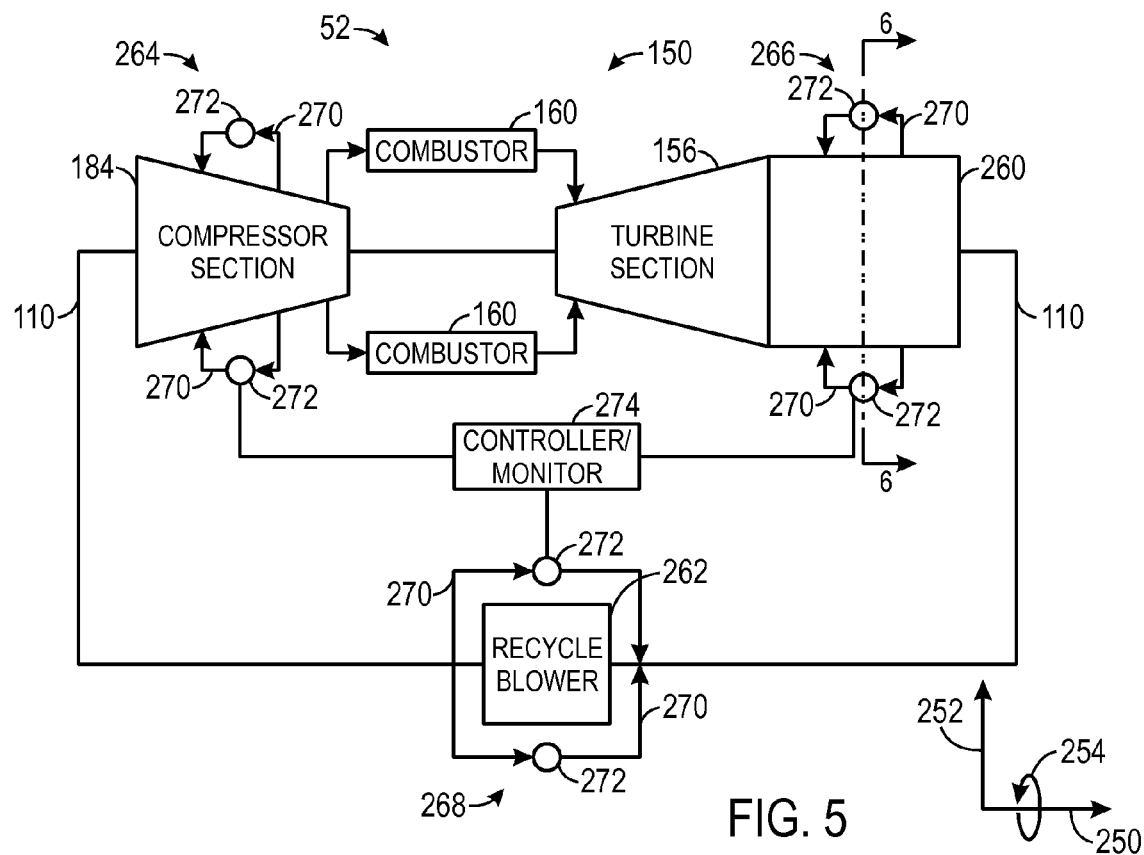
FIG. 5 is a diagram of an embodiment of the system of FIG. 2, further illustrating a monitoring/control system and an exhaust gas recirculation system.

As set forth above, present embodiments include systems and methods by which a number of sense streams may be passively extracted from a gas flow in a portion of a gas turbine system (e.g., the SEGR system 52) and directed through a number of extraction passages for analysis. Further, as set forth above, the present approach may be useful in any contexts involving the passive sampling of a gas flow near a piece of equipment (e.g., a rotary machine) that operates under or provides a pressure differential. With the foregoing in mind, FIG. 5 is a diagram of an embodiment of the SEGR gas turbine system 52 of FIG. 2. As illustrated in FIG. 5, the SEGR gas turbine system 52 includes a compressor section 184, a number of combustors 160, and a turbine section 156 coupled together as set forth above. Also included in FIG. 5, a directional key illustrates an axial direction 250, a radial direction 252, and a circumferential direction 254, defined relative to the axis of rotation of the gas turbine engine 150.

The SEGR gas turbine system 52 illustrated in FIG. 5 includes an exhaust section 260 that is coupled to the turbine section 156 and receives a flow of exhaust gas exiting the final stage of the turbine section 156. Further, the illustrated SEGR gas turbine system 52 includes an exhaust recirculation path 110 that generally routes the flow of exhaust gas through a recycle blower 262, which may adjust a flow rate of the exhaust gas through the exhaust recirculation path 110 before the flow of exhaust gas is returned to an inlet of the compressor section 184. It may be appreciated that, in certain embodiments, any number of other exhaust gas processing elements of the discussed above may be disposed along the exhaust gas recirculation path 110.

Additionally, the SEGR gas turbine system 52 illustrated in FIG. 5 includes three sets of gas flow extraction systems (e.g., exhaust gas sampling systems), namely a gas flow extraction system 264 coupled to the compressor section 184, a gas flow extraction system 266 coupled to the exhaust section 260, and a gas flow extraction system 268 near the recycle blower 262. Further, each gas flow extraction system includes a number of extraction passages 270, and each extraction path includes at least one sensor 272. Each extraction passage 270 is arranged to extract a sense stream from a gas flow at a relatively downstream, high pressure region and return the sense stream back to the gas flow at a relatively upstream, lower pressure region (as indicated by the illustrated directional indicators on each extraction passage 270). It should be appreciated that the aforementioned pressure differential enables the extraction passages 270 to be passive, meaning that the pressure difference between the extraction points and the return points of each extraction passage 270 may drive the sense stream through the extraction passages 270 without additional work being performed (e.g., using a blower unit, fan, or other active mechanism). Further, it may be appreciated that, as discussed in greater detail below, the dimensions of each extraction passage 270 may control a flow rate of the sense stream through the extraction passage 270. Additionally, while the exhaust section 260, the compressor section 184, and the recycle blower 262 are provided as examples of suitable locations for gas flow extraction systems, it should be noted that, in other embodiments, gas flow extractions systems may be disposed between any two points of the SEGR gas turbine system 52 providing the appropriate pressure differential (e.g., including the combustor 160, the exhaust flow path 110, the compressor section 184, the turbine section 156, the exhaust section 260, the recycle blower 262, or any combination thereof). Additionally, in certain embodiments, a gas flow extraction system may include one or more extraction passages 270 suitably positioned to extract a portion of a flow stream from a higher pressure portion of the EGR flow path (e.g., exhaust flow path 110) and to exhaust the extracted portion of the flow stream to the atmosphere (e.g., through a vent stack) after one or more measurements have been performed.

Each sensor 272 of the SEGR gas turbine system 52 illustrated in FIG. 5 is coupled to a respective extraction path 270 (e.g., extraction conduit) such that the sensor 272 may measure one or more properties of a sense stream traversing the respective extraction path 270. In certain embodiments, the sensors 272 may include, for example, temperature sensors, flow sensors, pressure sensors, oxygen sensors, carbon monoxide sensors, nitrogen oxide sensors, water vapor sensors, hydrogen sensors, unburnt fuel sensors, or any combinations thereof. In particular, in certain embodiments, the sensors 272 may include wide-band lambda sensors and/or universal exhaust gas oxygen (UEGO) sensors, which are similar to oxygen sensors used in automotive vehicles.

Furthermore, as illustrated in FIG. 5, each sensor 272 may be communicatively coupled to a controller/monitor 274 (e.g., of the control system 100 set forth above), which may receive input from the sensors 272 to determine and/or control one or more parameters of the SEGR gas turbine system 52 based, at least in part, on the received inputs. For example, in certain embodiments, the controller/monitor 274 may be a Mark*VIe™ controller, or a 3500 Encore Asset Condition monitor (both available from General Electric Co., of Schenectady, N.Y.), or another suitable monitor or controller. Additionally, it may be appreciated that, in certain embodiments, the controller/monitor 274 may be coupled to other components of the SEGR gas turbine system 52 (e.g., the compressor section 184, the combustors 160, etc.) to control or monitor the operation of the SEGR gas turbine system 52. For example, in certain embodiments, the controller/monitor 274 may utilize the inputs from the sensors 272 to determine information regarding the composition of the gas flow, such as a level of oxygen, carbon monoxide, hydrogen, fuel, nitrogen oxide, and/or water vapor in a gas flow based on the inputs provided by the sensors 272 corresponding to measurements of their respective sense streams. Furthermore, in certain embodiments, the controller 274 may adjust parameters of the SEGR gas turbine system 52, such as adjusting the fuel mixture, a fuel flow rate, an oxidant intake rate, a fuel-oxidant ratio, an exhaust gas recirculation rate, an equivalence ratio of combustion ($\Phi$) (e.g., between 0.95 and 1.05, or near 1.0 to provide substantially stoichiometric combustion), or similar parameters based, at least in part, on the determined composition of the gas flow.

Figure 6:
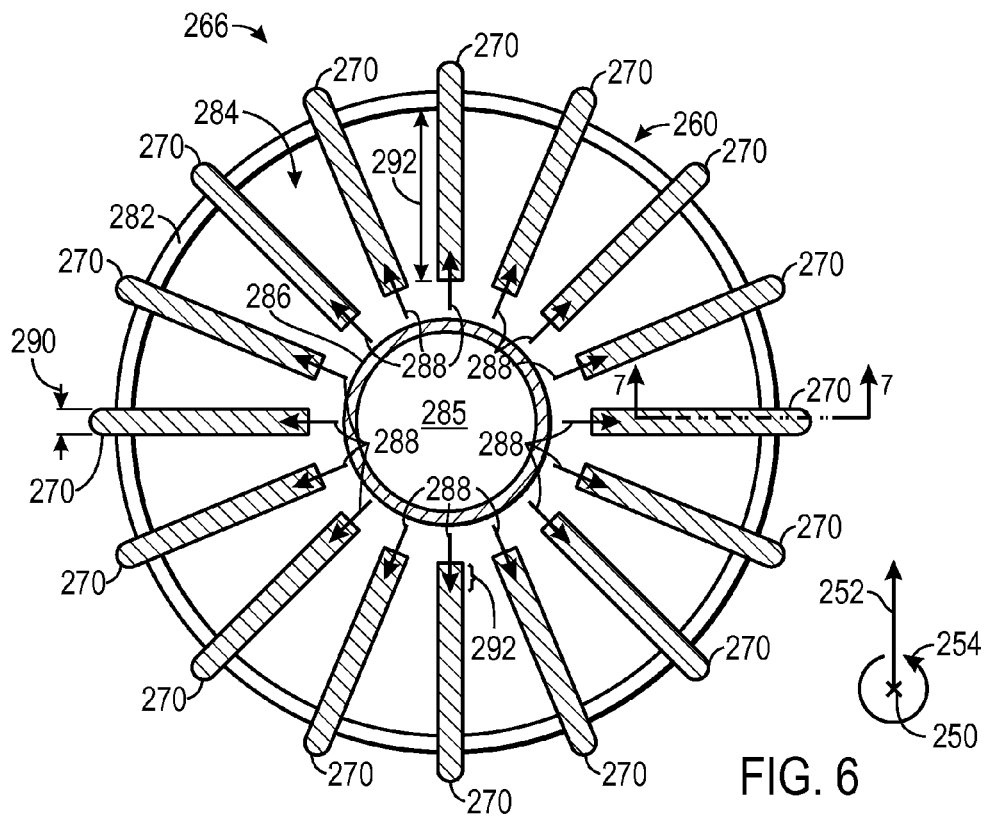
FIG. 6 is a cross-sectional view of an embodiment of an exhaust section of the system of FIG. 5, taken along line 6-6.

To better illustrate one example of a gas flow extraction system, FIG. 6 illustrates a cross-sectional view of the exhaust section 260 of FIG. 5, which includes the gas flow extraction system 266, taken along line 6-6 (e.g., along the radial direction 252). Accordingly, as illustrated in FIG. 6, the extraction passages 270 each extend radially 252 through an outer casing 282 of the exhaust section 260. These extraction passages 270 may be rigidly mounted to the outer casing 282 to prevent movement during operation. Further, after traversing the outer casing 282, each illustrated extraction passage 270 extends into an exhaust flow path 284 that is disposed between the outer casing 282 and the inner portion 286 (e.g., inner casing) of the exhaust section 260. As illustrated, the exhaust flow path 284 may be disposed between the outer casing 282 and the inner portion 286 in a coaxial or concentric arrangement. It may be appreciated that, in certain embodiments, the inner casing 286 may provide a path for a flow 285 of a coolant gas. During operation of the SEGR gas turbine system 52, hot exhaust gas exiting the final stage of the turbine section 156 may be directed along an exhaust flow path 284 between the outer casing 282 and the inner casing 286 of the exhaust section 260 (e.g., along the axial direction 250).

Furthermore, as set forth above, during operation of the exhaust section 260, the gas flow extraction system 266 may generally extract sense streams 288 from the gas flow traversing the exhaust flow path 284 of the exhaust section 260. For example, as illustrated in FIG. 6, the gas flow extraction system 266 includes 16 extraction passages 270 oriented in radial directions 252 and spaced circumferentially 254 about the axis 250, and extending into and in fluid communication with portions of the exhaust flow path 284. In certain embodiments, the extraction passages 270 may be flush, protruding toward the axis 250, recessed away from the axis 250, or a combination thereof, relative to the outer casing 282. It may be appreciated that, in certain embodiments, any number of extraction passages 270 may be used, such as 1 to 100, 2 to 50, 3 to 40, 4 to 30, 5 to 15 or any other suitable number of extraction passages at one or more axial positions, circumferential positions, and/or radial positions. Furthermore, in other embodiments, the extraction passages may not be evenly distributed about the axis 250 as illustrated in FIG. 6, but rather may be staggered or concentrated on a particular portion of the exhaust section 260 (e.g., at the top, bottom, or at a side of the exhaust section 260).

Additionally, it may be appreciated that the size, shape, and positioning of the extraction passages 270 may regulate the flow of the sense streams 288 extracted by the gas flow extraction system 266 illustrated in FIG. 6. For example, each extraction passage 270 may have a particular diameter 290 that may regulate or meter a particular volume of the exhaust gas flow traversing the extraction passage 270 per unit of time. Additionally, the exhaust gas flow traversing the exhaust flow path 284 of the exhaust section 260 may not be completely uniform and, as such, the flow rates, temperature, composition, and so forth of the exhaust gas flow may vary at different locations within the exhaust flow path 284.

Accordingly, as illustrated in FIG. 6, the extraction passages 270 may also be positioned to extend a particular distance 292 (e.g., a radial offset) from the wall of outer casing 282 of the exhaust section 260, such that a particular region of the exhaust gas flow traversing the exhaust flow path 284 may be extracted for the sense streams 288. It may be appreciated that, in certain embodiments, the distance 292 may be greater, and the extraction passages 270 may extend deeper into the exhaust flow path 284. Furthermore, in certain embodiments, each of the extraction passages 270 may extend a different distance 292 into the exhaust flow path 284, enabling each extraction passage 270 to sample a different region of the exhaust gas flow. Additionally, in certain embodiments, each of the extraction passages 270 include a cylindrical conduit, a conical conduit, a rectangular conduit, or any combination thereof, to provide a particular sense stream flow. Further, the shape of each entrance to each extraction passage 270 may also have a particular shape (e.g., cylindrical, conical, notched, or another shape) and/or a pitch suitable to encourage sense streams 288 to enter and traverse the extraction passages 270.

The sense streams 288 may be relatively small compared to the larger gas flow being extracted by the gas flow extraction system 266. For example, in certain embodiments, the flow rate of exhaust gas (e.g., through the exhaust flow path 284 of the exhaust section 260) may be between approximately 1800 and 2000 pounds per second (lbs/s) (e.g., between approximately 800 and 900 kilograms per second), while each sense stream 288 may have a flow rate between approximately 0.01 lbs/s and 1 lbs/s (e.g., between approximately 0.1 and 1 kilograms per second). By further example, in certain embodiments, each sense stream 288 may have a flow rate that represents less than or approximately 0.0001%, 0.0005%, 0.001%, 0.005%, 0.01%, 0.05%, 0.1%, or 1% of the flow rate of the gas flow being sampled.

Figure 7:
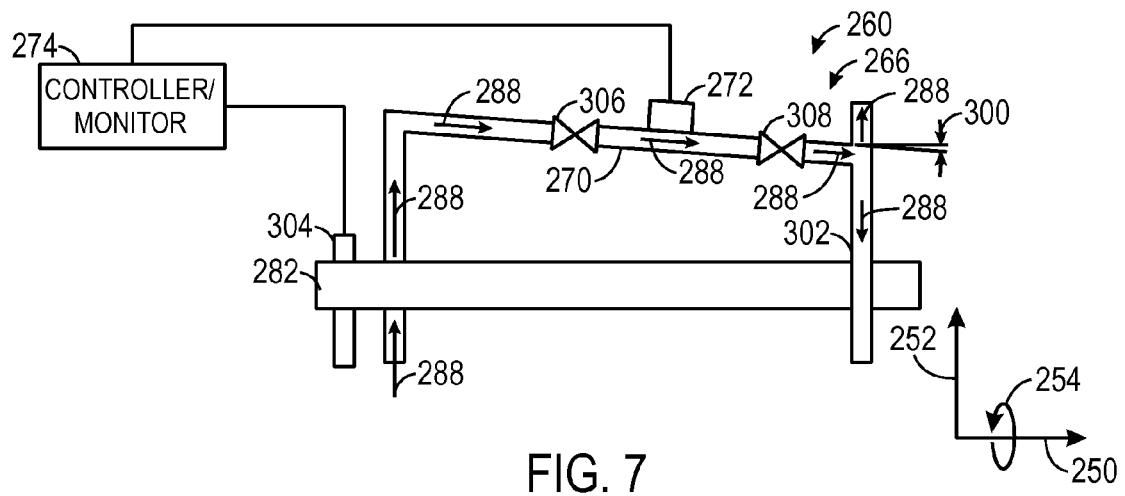
FIG. 7 is a cross-sectional view of an embodiment of an exhaust extraction passage of the system of FIG. 6, taken along line 7-7.
Figure 8:
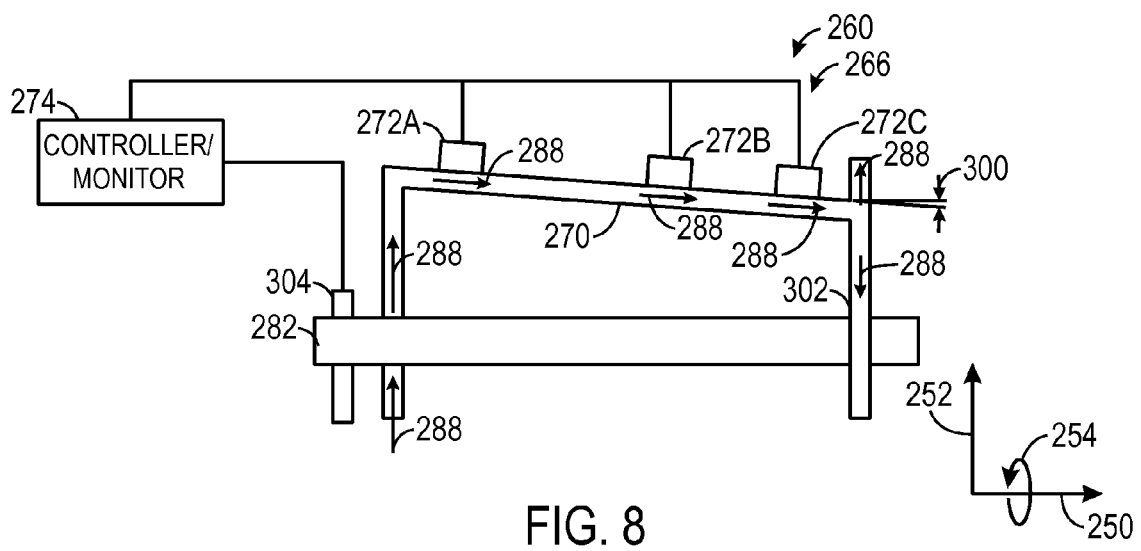
FIG. 8 is a cross-sectional view of an alternative embodiment of an exhaust extraction passage of the system of FIG. 6, taken along line 7-7.

FIGS. 7 and 8 are diagrams respectively illustrating two example embodiments of an extraction passage 270 of the gas flow extraction system 266, as illustrated in FIG. 6, taken along line 7-7. Both FIGS. 7 and 8 illustrate an extraction passage 270 that, as previously discussed, extends through the outer casing 282 of the exhaust section 26. Further, the extraction passage 270 of FIGS. 7 and 8 subsequently extends at a downward sloping angle 300 (e.g., relative to the axial direction 250) to meet with a ring manifold 302. As discussed in greater detail below, in certain embodiments, the downward sloping angle 300 may be greater than approximately 1 degree (e.g., greater than or equal to 2, 5, 10, 15, 20, 25, 30, 35, 40, or 45 degrees) such that the extraction passage 270 generally slopes downward (e.g., radially toward the axis 250) as it approaches the manifold 302, for example, to allow condensate to drain. In other embodiments, the angle 300 may be 0 degrees or less than zero degrees. As discussed in detail below, in certain embodiments, each of the extraction passages 270 may be coupled to a common manifold, such as the ring manifold 302. As such, while the sense stream 288 may move through the extraction passage 270 in one direction, once the sense stream 288 reaches the ring manifold, the sense stream 288 may be free to move (e.g., in an inward or outward radial direction 252, in a clockwise and/or counterclockwise circumferential direction 254, or a combination thereof) within the ring manifold 302.

Additionally, the illustrated embodiments of FIGS. 7 and 8 both include the controller/monitor 274 that is, as set forth above, coupled to sensors of the SEGR gas turbine system 52. As illustrated, the controller/monitor 274 is coupled to a sensor 304 (e.g., a temperature sensor, a pressure sensor, a flow rate sensor, or another suitable sensor) that extends through the outer casing 282 of the exhaust section 260, toward the inner portion 286. In certain embodiments, the sensor 304 may be a temperature sensor that measures a temperature of the gas flow traversing the exhaust section 260 or another suitable sensor. It may be appreciated that, in other embodiments, the sensor 304 may not be present. Additionally, the illustrated embodiments of FIGS. 7 and 8 both include one or more sensors 272 (e.g., temperature sensors, oxygen sensors, carbon monoxide sensors, nitrogen oxide sensors, water vapor sensors, hydrogen sensors, unburnt fuel sensors, or any combinations thereof), also coupled to the controller/monitor 274, which are discussed in detail below.

Turning to FIG. 7, in addition to the features described above, the illustrated embodiment includes a first isolation valve 306 and a second isolation valve 308 that are disposed on opposite sides (e.g., on an upstream side and a downstream side, relative to the flow of the sense stream 288) of at least one sensor 272 (e.g., a lambda or UEGO sensor 272). In some embodiments, any number of sensors 272 (e.g., 1, 2, 3, 4, 5, or more) may be disposed between isolation valves 306 and 308. It may be appreciated that the isolation valves 306 and 308 are generally capable of being closed to limit or block the flow of the sense stream 288 through the extraction passage 270 during operation of the exhaust section 260. That is, the first and second isolation valves 306 and 308 may be closed (e.g., manually or automatically based on input from the controller 274), for example, so that the sensor 272 and/or portions of the extraction passage 270 may be removed, replaced, or maintained without interfering with the operation of the SEGR gas turbine system 52. Additionally, in certain embodiments, other valves, such as bleed valves or vent valves, may be disposed between the isolation valves 306 and 308 to enable a "double-block and bleed" valve arrangement.

In contrast, as illustrated in FIG. 8, in certain embodiments, the gas flow extraction system 266 may exclude isolation valves (e.g., isolation valves 306 and 308 of FIG. 7). In the embodiment of FIG. 8, three sensors (e.g., sensors 272A, 272B, and 272C) are coupled to the extraction passage 270, but are not isolated from the remainder of the extraction passage by isolation valves. It may be appreciated that, while three sensors are illustrated in FIG. 8, in other embodiments, 2, 4, 5, 6, 7, 8, 9, 10, 11, 12, or any other suitable number of sensors 272 may be coupled to the extraction passage 270 to analyze the sense stream 288. Further, in certain embodiments, these sensors 272 may include temperature sensors, flow sensors, pressure sensors, oxygen sensors (e.g., lambda sensors or UEGO sensors), carbon monoxide sensors, nitrogen oxide sensors, water vapor sensors, hydrogen sensors, unburnt fuel sensors, or any combinations thereof. Additionally, it may be appreciated that the controller/monitor 274 may utilize measurements collected by the sensors 272 (e.g., sensors 272A-C) to determine how to adjust parameters (e.g., a fuel mixture, a fuel flow rate, an oxidant intake rate, a fuel-oxidant ratio, an exhaust gas recirculation rate, or an equivalence ratio of combustion, and/or another suitable parameter) of the SEGR gas turbine system 52.

Figure 9:
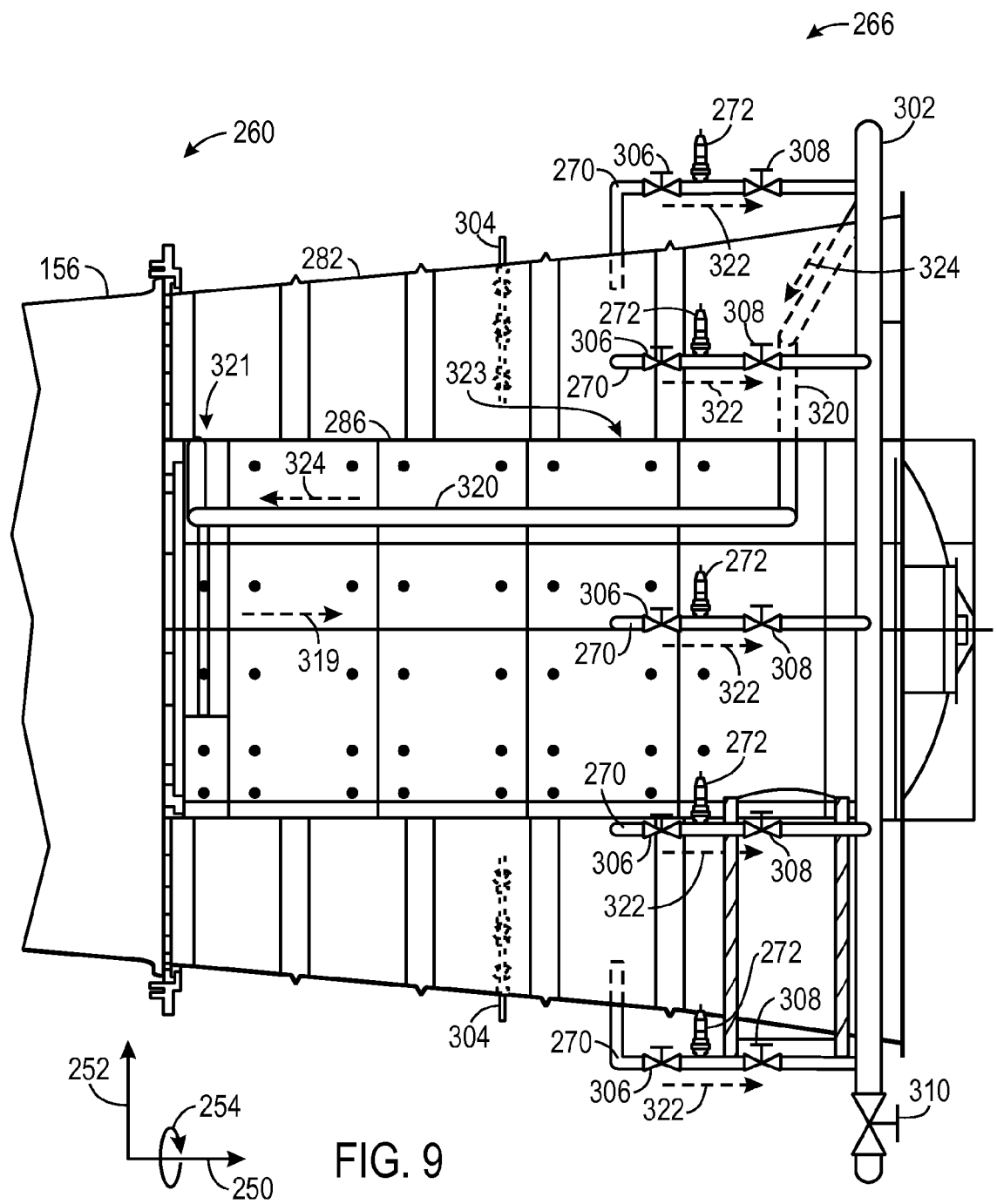
FIG. 9 is a diagram of an embodiment of an exhaust section of the system of FIG. 5 having an internal return passage.
Figure 10:
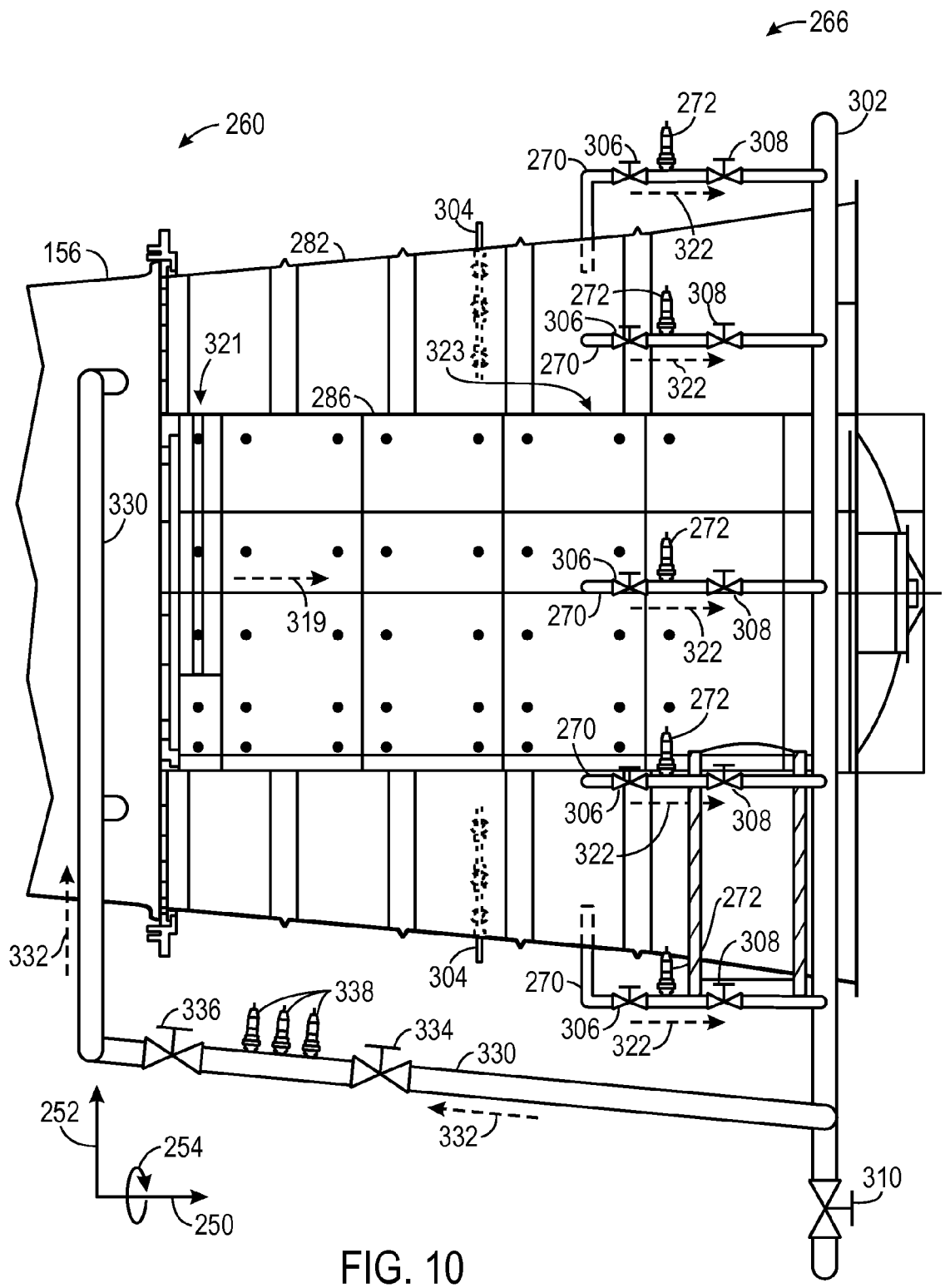
FIG. 10 is a diagram of an embodiment of an exhaust section of the system of FIG. 5 having an external return passage.

FIGS. 9 and 10 are diagrams respectively illustrating embodiments of the gas flow extraction system 266 coupled to the exhaust section 260 of the SEGR gas turbine system 52. The embodiments of FIGS. 9 and 10 include several features in common with one another. For example, the embodiments of FIGS. 9 and 10 both include a number of extraction passages 270 extending from the inner portion 286, through the outer casing 282 of the exhaust section 260, and extending in the axial direction 250 toward the ring manifold 302, which is illustrated as encircling the outer casing 282 of the exhaust section 260. Furthermore, as mentioned above, the extraction passages 270 may include a particular downward sloping angle (e.g., downward sloping angle 300 illustrated in FIGS. 7 and 8) that may facilitate drainage of condensate toward the ring manifold 302. Accordingly, the ring manifold 302 may include a drain feature 310 near the bottom of the ring manifold 302, or disposed at another suitable low-point in the gas flow extraction system 266, to enable removal of the condensate from the ring manifold 302. In certain embodiments, the drain feature may include one or more of a drain pipe, a drainage check valve, filters, a collection tank, or a combination thereof. Furthermore, it may be appreciated that, in certain embodiments, the ring manifold 302 may positioned upstream of the extraction passages 270 (with respect to the direction 319 of the exhaust gas flow through the exhaust section 266 of the SEGR gas turbine system 52) without negating the effect of the present approach.

Further, the embodiments of FIGS. 9 and 10 both illustrate a sensor 272 disposed between isolation valves 306 and 308 along each extraction passage 270. As set forth above, while only one sensor 272 is illustrated along each extraction path 270, in certain embodiments, any number of sensors 272 (e.g., temperature sensors, oxygen sensors, carbon monoxide sensors, nitrogen oxide sensors, water vapor sensors, hydrogen sensors, unburnt fuel sensors, or any combinations thereof) may be disposed along each extraction passage 270. Further, while not illustrated in FIGS. 9 and 10, each of the sensors 270 and 304 may be communicatively coupled to the controller/monitor 274, as discussed above.

The embodiment of the gas flow extraction system 266 illustrated in FIG. 9 is an example of a gas flow extraction system 266 having an internal return passage 320. In the embodiment of FIG. 9, a number of sense streams are extracted from the exhaust gas flow traversing the inner portion 286 of the exhaust section 260 by the extraction passages 270. The sense streams may traverse the extraction passages 270 in an axial direction 250 toward the ring manifold 302, as illustrated by arrows 322. Once delivered to the manifold 302, the combined sense streams may be directed toward the internal return passage 320, as illustrated by the arrows 324. The internal return passage 320 generally couples the ring manifold 302 to an upstream region 321 of the inner portion 286 of the exhaust section 260. In particular, with reference to a downstream direction 319 of exhaust gas flow, the upstream region 321 is upstream relative to a downstream region 323 of the inner portion 286, wherein the downstream region 323 is the area of extraction of the sense streams by the extraction passages 270. Further, the internal return passage 320, as the name suggests, may be at least partially disposed inside the outer casing 282 and the inner portion 286 of the exhaust section 260. It may be appreciated that utilizing an internal return passage 320, as illustrated in FIG. 9, may afford benefits. For example, an internal return passage 320 may provide little or no obstructions about the periphery of the exhaust section 260, allowing space for other equipment, devices, or passages. Further, the internal return passage 320 may lose less exhaust heat to the ambient environment than other return passage options. In other embodiments, multiple return passages may be utilized to return the sense stream to an upstream portion of the exhaust gas flow.

The embodiment of the gas flow extraction system 266 illustrated in FIG. 10 is an example of a gas flow extraction system 266 having an external return passage 330. In the embodiment of FIG. 10, a number of sense streams are extracted by the extraction passages 270 from the exhaust gas flow traversing the inner portion 286 of the exhaust section 260. The sense streams may traverse the extraction passages 270 in an axial direction 250 toward the ring manifold 302, as illustrated by arrows 322. Once delivered to the manifold 302, the combined sense streams may be directed toward the external return passage 330, as illustrated by the arrows 332. The illustrated external return passage 330 generally couples the ring manifold 302 to the upstream region 321. Further, the upstream region 321 is generally upstream (with respect to the direction 319 of the exhaust gas flow) of the downstream region 323, wherein the sense streams are extracted by the extraction passages 270. For the embodiment illustrated in FIG. 10, the external return passage 330 couples the ring manifold 302 to a portion of the turbine section 156, just downstream the final stage of the turbine section 156. In other embodiments, the external return passage 270 may instead couple the ring manifold 302 to an upstream region of the inner portion 286 of the exhaust section 260, relative to the region of the inner portion 286 in which the sense streams were extracted by the extraction passages 270.

Additionally, the gas flow extraction system 266 illustrated in FIG. 10 includes a number of sensors 338 disposed between isolation valves 334 and 336 along the external return passage 330. In certain embodiments, the isolation valves 334 and 336 may not be present. In certain embodiments, any number of sensors 338 (e.g., temperature sensors, oxygen sensors, carbon monoxide sensors, nitrogen oxide sensors, water vapor sensors, hydrogen sensors, unburnt fuel sensors, or any combinations thereof) may be disposed along the external return passage 330 to perform one or more measurements of the combined sense streams exiting the manifold 302. It may be appreciated that, in certain embodiments, the measurements provided by the sensors 338 of the external return passage 330 may supplement the measurements performed by the sensors 272 of each extraction passage 270, such that comparisons may be made between the nature of the exhaust gas extracted by a particular extraction passage 270 and the nature of the mixed or average exhaust gas extracted by all of the extraction passages 270. Further, while not illustrated in FIG. 10, each of the sensors 338 may be communicatively coupled to the controller/monitor 274, like the sensors 272 discussed above.

It may be appreciated that, while the external return passage 330 illustrated in FIG. 10 is illustrated as being disposed below the exhaust section 260, in other embodiments, the external return passage 330 may be disposed above the exhaust section 260 without negating the effect of the present approach. Further, the external return passage 330, as illustrated in FIG. 10, may be partially or entirely disposed outside of the outer casing 282 of the exhaust section 260. It may be appreciated that utilizing an external return passage 330, as illustrated in FIG. 10, may afford benefits. For example, the external return passage 330 may involve fewer modifications to the exhaust section 260 when installing the gas flow extraction system 266. Further, the external return passage 330 may be easier to access for maintenance or repairs than an internal return passage 320, as discussed above.

Technical effects of the present approach include enabling the passive extraction of a sense stream from a gas flow based on a pressure differential. Present embodiments enable multiple sense streams to be extracted from a gas flow via a number of extraction paths, in which the dimensions of the extraction paths may regulate the sense stream to be a small fraction (e.g., less than approximately 1%) of the total exhaust gas flow. Further, each extraction path may include one or more sensors (e.g., temperature sensors, pressure sensors, flow sensors, oxygen sensors, carbon monoxide sensors, nitrogen oxide sensors, water vapor sensors, hydrogen sensors, unburnt fuel sensors, or any combinations thereof) that are capable of performing measurements on each sense stream, such that a controller/monitor may determine parameters of the gas flow based, at least in part, on the measurements. Additionally, the disclosed embodiments may include other features, such as isolation valves, drains, internal or external return paths, and so forth, that may provide additional benefits, for example, in terms of maintenance and repair of the gas flow extraction system.

ADDITIONAL DESCRIPTION

As set forth above, the present embodiments provide systems and methods for using treated exhaust gas for temperature control, pressure control, humidity control, purging, clearance control, and/or sealing of various components of turbine-based service systems. It should be noted that any one or a combination of the features described above may be utilized in any suitable combination. Indeed, all permutations of such combinations are presently contemplated. By way of example, the following clauses are offered as further description of the present disclosure:

Embodiment 1. A system, comprising: a gas turbine engine, comprising: a combustor section having one or more combustors configured to combust a fuel and produce an exhaust gas; a turbine section comprising one or more turbine stages disposed downstream from the combustor and configured to be driven by the exhaust gas; an exhaust section disposed downstream from the one or more turbine stages, wherein the exhaust section comprises an exhaust passage configured to receive the exhaust gas from the turbine section; and a gas flow extraction system coupled to the exhaust section and comprising a plurality of extraction passages disposed about the exhaust section, wherein each extraction path is configured to receive a portion of the exhaust gas from a downstream portion of the exhaust passage, wherein the gas flow extraction system is configured to passively route the portion of the exhaust gas to an upstream portion of the exhaust passage via one or more return passages.

Embodiment 2. The system of any preceding embodiment, wherein each of the plurality of extraction passages comprises one or more sensors.

Embodiment 3. The system of any preceding embodiment, wherein the one or more sensors comprise an oxygen sensor, a carbon monoxide sensor, a nitrogen oxide ($NO_x$) sensor, a water vapor sensor, a hydrogen sensor, an unburnt fuel sensor, or a combination thereof.

Embodiment 4. The system of any preceding embodiment, wherein each of the plurality of extraction passages comprises a first valve disposed upstream of the one or more sensors and a second valve disposed downstream of the one or more sensors.

Embodiment 5. The system of any preceding embodiment, comprising a controller coupled to the one or more sensors, wherein the controller is configured to control operation of the gas turbine engine based, at least in part, on respective outputs of the one or more sensors.

Embodiment 6. The system of any preceding embodiment, wherein the controller is configured to control the gas turbine engine to provide substantially stoichiometric combustion.

Embodiment 7. The system of any preceding embodiment, wherein the plurality of extraction passages are spaced evenly about a circumference of the exhaust section.

Embodiment 8. The system of any preceding embodiment, wherein the gas flow extraction system comprises a ring manifold disposed around the exhaust section and coupled to each of the plurality of extraction passages.

Embodiment 9. The system of any preceding embodiment, wherein the ring manifold, the plurality of extraction passages, and the one or more return passages are configured to allow condensate to accumulate and to be drained from a low point in the gas flow extraction system.

Embodiment 10. The system of any preceding embodiment, wherein the one or more return passages comprise one or more internal return passages that are disposed substantially within a portion of the exhaust section.

Embodiment 11. The system of any preceding embodiment, wherein the one or more return passages comprises one or more external return passages that are disposed substantially outside of the exhaust section.

Embodiment 12. The system of any preceding embodiment, comprising a compressor section configured to compress and route the exhaust gas to the combustor section.

Embodiment 13. The system of any preceding embodiment, comprising an exhaust gas recirculation loop coupled to the exhaust section and to the compressor section, wherein the exhaust gas recirculation loop is configured to receive the exhaust gas from the exhaust section and to provide the exhaust gas to the compressor section.

Embodiment 14. The system of any preceding embodiment, wherein the one or more combustors are configured to combust the fuel in the presence of an oxidant and the exhaust gas.

Embodiment 15. The system of any preceding embodiment, wherein the one or more combustors are configured to stoichiometrically combust the fuel in the presence of the oxidant and the exhaust gas.

Embodiment 16. The system of any preceding embodiment, comprising an exhaust gas extraction system configured to extract and provide the exhaust gas to a hydrocarbon system.

Embodiment 17. A method, comprising: combusting a fuel with an oxidant in a combustor of a gas turbine system to generate an exhaust gas; driving a turbine of the gas turbine system with the exhaust gas from the combustor; providing the exhaust gas from the turbine through an exhaust passage in an exhaust section of the gas turbine system; passively extracting a portion of the exhaust gas from a downstream portion of the exhaust passage via one or more extraction passages; performing one or more measurements on the portion of the exhaust gas using one or more sensors coupled to the one or more extraction passages; and passively routing the portion of the exhaust gas to an upstream portion of the exhaust passage via one or more return passages.

Embodiment 18. The method of any preceding embodiment, comprising determining one or more properties of the portion of the exhaust gas based on the one or more measurements.

Embodiment 19. The method of any preceding embodiment, wherein the one or more properties comprise an oxygen content, a water vapor content, a nitrogen oxide ($NO_x$) content, a carbon monoxide content, a hydrogen content, an unburnt fuel content, or a combination thereof Embodiment 20. The method of any preceding embodiment, comprising adjusting one or more parameters of the gas turbine system based, at least in part, on the one or more properties of the portion of the exhaust gas.

Embodiment 21. The method of any preceding embodiment, wherein adjusting the one or more parameters of the gas turbine system comprises adjusting one or more of a fuel mixture, a fuel flow rate, an oxidant intake rate, a fuel-oxidant ratio, an exhaust gas recirculation rate, or an equivalence ratio of combustion.

Embodiment 22. The method of any preceding embodiment, wherein the one or more measurements comprise temperature measurements, flow rate measurements, pressure measurements, composition measurements, or a combination thereof Embodiment 23. The method of any preceding embodiment, wherein the one or more measurements comprise an oxygen content measurement.

Embodiment 24. The method of any preceding embodiment, wherein the one or more measurements comprise a carbon monoxide content measurement, a nitrogen oxide ($NO_x$) content measurement, a water vapor content measurement, or a hydrogen content measurement.

Embodiment 25. The method of any preceding embodiment, wherein combusting the fuel comprises stoichiometrically combusting the fuel with the oxidant and exhaust gas.

Embodiment 26. The method of any preceding embodiment, comprising compressing the exhaust gas and providing the compressed exhaust gas to the combustor.

Embodiment 27. The method of any preceding embodiment, comprising passively routing the portion of the exhaust gas from the one or more extraction passages to a ring manifold before routing the exhaust gas to the upstream portion of the exhaust passage via the one or more return passages.

Embodiment 28. The method of any preceding embodiment, comprising draining a condensate from the ring manifold via a drain feature.

Embodiment 29. A system, comprising: a gas flow path through a rotary machine, wherein the gas flow path comprises a high-pressure downstream region and a low-pressure upstream region; an extraction passage configured to passively extract a portion of a gas flow from the high-pressure downstream region of the gas flow path; a sensor coupled to the extraction passage, wherein the sensor is configured to measure a parameter of the portion of the gas flow traversing the extraction passage; and a return passage coupled to the extraction passage, wherein the return passage is configured to passively route the portion of the gas flow from the extraction passage to the low-pressure upstream region of the gas flow path.

Embodiment 30. The system of any preceding embodiment, wherein the portion of the gas flow is less than approximately 1% of the gas flow.

Embodiment 31. The system of any preceding embodiment, wherein a flow rate of the portion of the gas flow is based, at least in part, on a diameter of the extraction passage, a position of the extraction passage in the high-pressure downstream region, a diameter of the return passage, and a position of the return passage in the low-pressure upstream region.

Embodiment 32. The system of any preceding embodiment, wherein the rotary machine comprises an exhaust section, a compressor section, or a recycle blower of a gas turbine system.

Embodiment 33. The system of any preceding embodiment, wherein the gas turbine system comprises an exhaust gas recirculation (EGR) gas turbine system.

Embodiment 34. The system of any preceding embodiment, wherein the sensor comprises a wide-band lambda sensor.

Embodiment 35. The system of any preceding embodiment, wherein the sensor comprises a universal exhaust gas oxygen (UEGO) sensor.

Embodiment 36. The system of any preceding embodiment, wherein the parameter of the portion of the gas flow comprises a chemical composition, a temperature, or a combination thereof Embodiment 37. The system of any preceding embodiment, wherein the extraction passage comprises a first isolation valve disposed upstream of the sensor and a second isolation valve disposed downstream of the sensor, wherein the first and second isolation valves, when closed, are configured to block the portion of the gas flow past the sensor to enable replacement of the sensor while the system is operational.

Embodiment 38. The system of any preceding embodiment, comprising a manifold coupled to the extraction passage and the return passage, wherein the manifold is configured to receive the portion of the gas flow from the extraction passage and to provide the portion of the gas flow to the return passage.

Embodiment 39. The system of any preceding embodiment, wherein the manifold comprises a ring manifold disposed around the rotary machine.

Embodiment 40. The system of any preceding embodiment, wherein the manifold comprises a drain to remove a condensate from the manifold.

Embodiment 41. The system of any preceding embodiment, wherein the return passage is an internal return passage disposed substantially inside a portion of the rotary machine.

Embodiment 42. The system of any preceding embodiment, wherein the return passage is an external return passage disposed substantially outside a portion of the rotary machine.

Embodiment 43. A system, comprising: a plurality of extraction passages configured to passively extract a portion of a gas flow from a downstream region of a gas flow path; a plurality of sensors respectively coupled to the plurality of extraction passages, wherein the plurality of sensors is configured to measure one or more parameters of the portion of the gas flow traversing the plurality of extraction passages; a manifold coupled to the plurality of extraction passages, wherein the manifold is configured to receive the portion of the gas flow from the plurality of extraction passages; and a return passage coupled to the manifold, wherein the return passage is configured to passively provide the portion of the gas flow to an upstream region of the gas flow path.

Embodiment 44. The system of any preceding embodiment, comprising a plurality of isolation valves respectively disposed upstream and downstream of the plurality of sensors, wherein plurality of isolation valves, when closed, are configured to block the portion of the gas flow from traversing the plurality of extraction passages.

Embodiment 45. The system of any preceding embodiment, wherein the manifold comprises a ring manifold.

Embodiment 46. The system of any preceding embodiment, wherein the manifold comprises a drain to remove a condensate from the manifold.

Embodiment 47. The system of any preceding embodiment, wherein the plurality of extraction passages are disposed at a downward sloping angle to allow condensate to drain toward the manifold.

Embodiment 48. The system of any preceding embodiment, comprising a gas turbine system configured to provide the gas flow along the gas flow path.

Embodiment 49. The system of any preceding embodiment, wherein the gas turbine system comprises an exhaust gas recirculation (EGR) gas turbine system.

Embodiment 50. The system of any preceding embodiment, wherein the gas turbine system is a stoichiometric exhaust gas recirculation (SEGR) gas turbine system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a gas turbine engine, comprising:
a combustor section having one or more combustors configured to combust a fuel and produce an exhaust gas;
a turbine section comprising one or more turbine stages disposed downstream from the combustor and configured to be driven by the exhaust gas;
an exhaust section disposed downstream from the one or more turbine stages, wherein the exhaust section comprises an exhaust passage configured to receive the exhaust gas from the turbine section; and
a gas flow extraction system coupled to the exhaust section and comprising a plurality of extraction passages disposed about the exhaust section, wherein each extraction passage is configured to receive a portion of the exhaust gas from a downstream portion of the exhaust passage, wherein the gas flow extraction system is configured to passively route the portion of the exhaust gas to an upstream portion of the exhaust passage via one or more return passages, and wherein the gas flow extraction system comprises a ring manifold disposed around the exhaust section and coupled to each of the plurality of extraction passages, and wherein the ring manifold, the plurality of extraction passages, and the one or more return passages are configured to allow condensate to accumulate and to be drained from a low point in the gas flow extraction system.

2. The system of claim 1, wherein each of the plurality of extraction passages comprises one or more sensors.

3. The system of claim 2, wherein the one or more sensors comprise an oxygen sensor, a carbon monoxide sensor, a nitrogen oxide ($NO_x$) sensor, a water vapor sensor, a hydrogen sensor, an unburnt fuel sensor, or a combination thereof.

4. The system of claim 2, wherein the one or more sensors comprise a wide-band lambda sensor.

5. The system of claim 2, wherein the one or more sensors comprise a universal exhaust gas oxygen (UEGO) sensor.

6. The system of claim 2, comprising a controller coupled to the one or more sensors, wherein the controller is configured to control operation of the gas turbine engine based, at least in part, on respective outputs of the one or more sensors.

7. The system of claim 1, wherein the one or more return passages comprise one or more internal return passages that are disposed substantially within a portion of the exhaust section.

8. The system of claim 1, wherein the one or more return passages comprises one or more external return passages that are disposed substantially outside of the exhaust section.

9. The system of claim 1, comprising
a compressor section configured to compress and route the exhaust gas to the combustor section; and
an exhaust gas recirculation loop coupled to the exhaust section and to the compressor section, wherein the exhaust gas recirculation loop is configured to receive the exhaust gas from the exhaust section and to provide the exhaust gas to the compressor section.

10. A method, comprising:
combusting a fuel with an oxidant in a combustor of a gas turbine system to generate an exhaust gas;
driving a turbine of the gas turbine system with the exhaust gas from the combustor;
providing the exhaust gas from the turbine through an exhaust passage in an exhaust section of the gas turbine system;
passively extracting a portion of the exhaust gas from a downstream portion of the exhaust passage via one or more extraction passages;
performing one or more measurements on the portion of the exhaust gas using one or more sensors coupled to the one or more extraction passages;
passively routing the portion of the exhaust gas from the one or more extraction passages to a ring manifold; and
passively routing the portion of the exhaust gas from the ring manifold to an upstream portion of the exhaust passage via one or more return passages.

11. The method of claim 10, comprising determining one or more properties of the portion of the exhaust gas based on the one or more measurements.

12. The method of claim 11, wherein the one or more properties comprise an oxygen content, a water vapor content, a nitrogen oxide ($NO_x$) content, a carbon monoxide content, a hydrogen content, an unburnt fuel content, or a combination thereof.

13. The method of claim 11, comprising adjusting one or more parameters of the gas turbine system based, at least in part, on the one or more properties of the portion of the exhaust gas, wherein adjusting the one or more parameters of the gas turbine system comprises adjusting one or more of a fuel mixture, a fuel flow rate, an oxidant intake rate, a fuel-oxidant ratio, an exhaust gas recirculation rate, or an equivalence ratio of combustion.

14. The method of claim 10, wherein passively extracting the portion of the exhaust gas comprises opening one or more valves associated with each of the one or more extraction passages to allow the portion of the exhaust gas to traverse the one or more extraction passages.

15. The method of claim 10, wherein the one or more measurements comprise temperature measurements, flow rate measurements, pressure measurements, composition measurements, or a combination thereof.

16. The method of claim 10, wherein combusting the fuel comprises stoichiometrically combusting the fuel with the oxidant and exhaust gas.

17. A system, comprising:
a gas flow path through a rotary machine, wherein the gas flow path comprises a high-pressure region and a low-pressure region;
an extraction passage configured to passively extract a portion of a gas flow from the high-pressure region of the gas flow path;
a sensor coupled to the extraction passage, wherein the sensor is configured to measure a parameter of the portion of the gas flow traversing the extraction passage; and
a return passage coupled to the extraction passage, wherein the return passage is configured to passively route the portion of the gas flow from the extraction passage to the low-pressure region of the gas flow path, and wherein the return passage comprises one or more external return passages that are disposed substantially outside of an exhaust section.

18. The system of claim 17, wherein the portion of the gas flow is less than approximately 1% of the gas flow.

19. The system of claim 17, wherein a flow rate of the portion of the gas flow is based, at least in part, on a diameter of the extraction passage, a position of the extraction passage in the high-pressure region, a diameter of the return passage, and a position of the return passage in the low-pressure region.

20. The system of claim 17, wherein the rotary machine comprises an exhaust section, a compressor section, or a recycle blower of a gas turbine system.

21. The system of claim 17, wherein the extraction passage comprises a first isolation valve disposed upstream of the sensor and a second isolation valve disposed downstream of the sensor, wherein the first and second isolation valves, when closed, are configured to block the portion of the gas flow past the sensor to enable replacement of the sensor while the system is operational.

22. The system of claim 17, comprising a manifold coupled to the extraction passage and the return passage, wherein the manifold is configured to receive the portion of the gas flow from the extraction passage and to provide the portion of the gas flow to the return passage.

23. The system of claim 17, comprising a plurality of return passage sensors coupled to the return passage, wherein the plurality of return passage sensors is configured to measure the parameter of the portion of the gas flow traversing the return passage.

* * * * *